US010749962B2

(12) United States Patent
Lawson et al.

(10) Patent No.: US 10,749,962 B2
(45) Date of Patent: Aug. 18, 2020

(54) CLOUD GATEWAY FOR INDUSTRIAL AUTOMATION INFORMATION AND CONTROL SYSTEMS

(71) Applicant: Rockwell Automation Technologies, Inc., Mayfield Heights, OH (US)

(72) Inventors: Douglas C. Lawson, Silverado, CA (US); Douglas J. Reichard, Fairview Park, OH (US); Joseph A. Harkulich, Willoughby, OH (US); Rainer Hessmer, Rancho Santa Margarita, CA (US); Sujeet Chand, Brookfield, WI (US); David W. Farchmin, Grafton, WI (US); Michael John Pantaleano, Willoughby, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 373 days.

(21) Appl. No.: 15/490,076

(22) Filed: Apr. 18, 2017

(65) Prior Publication Data
US 2017/0223110 A1   Aug. 3, 2017

Related U.S. Application Data

(63) Continuation of application No. 13/615,195, filed on Sep. 13, 2012, now abandoned.
(Continued)

(51) Int. Cl.
*G06F 15/16* (2006.01)
*H04L 29/08* (2006.01)
(Continued)

(52) U.S. Cl.
CPC ...... *H04L 67/125* (2013.01); *G05B 19/41855* (2013.01); *G06F 21/64* (2013.01);
(Continued)

(58) Field of Classification Search
CPC ....... H04L 67/10; H04L 12/66; H04L 67/306; H04L 41/12; H04L 67/02; H04L 67/12;
(Continued)

(56) References Cited

U.S. PATENT DOCUMENTS 5,014,317 A   5/1991   Kita et al.
5,122,948 A   6/1992   Zapolin
(Continued)

FOREIGN PATENT DOCUMENTS

CN   1232553 A   10/1999
CN   1529837 A   9/2004
(Continued)

OTHER PUBLICATIONS

Final Office Action for U.S. Appl. No. 14/658,365 dated Sep. 8, 2017, 59 pages.
(Continued)

*Primary Examiner* — Karen C Tang
(74) *Attorney, Agent, or Firm* — Amin, Turocy & Watson, LLP

(57) ABSTRACT

A cloud gateway for coupling an industrial system to a cloud platform is provided. The cloud gateway collects data from one or more industrial controllers, meters, sensors, or other devices comprising an industrial automation system. The cloud gateway optionally performs additional transformations on the data to add context, summarize, filter, reformat, and/or encrypt the data. The cloud gateway then sends data to a cloud platform for use by one or more cloud-based applications or services. The cloud gateway can facilitate cloud-based data collection from both fixed-location and mobile industrial systems. The cloud gateway can also support store-and-forward logic, allowing industrial data to
(Continued)

be temporarily stored in local storage in the event that communication between the cloud gateway and the cloud platform is disrupted.

20 Claims, 18 Drawing Sheets

Related U.S. Application Data

(60) Provisional application No. 61/587,531, filed on Feb. 9, 2012, provisional application No. 61/642,964, filed on May 4, 2012.

(51) Int. Cl.
| | |
|---|---|
| *H04L 12/26* | (2006.01) |
| *G06F 21/64* | (2013.01) |
| *G06Q 10/06* | (2012.01) |
| *G05B 19/418* | (2006.01) |
| *H04L 12/66* | (2006.01) |
| *G06F 15/173* | (2006.01) |

(52) U.S. Cl.
CPC ....... *G06Q 10/06315* (2013.01); *H04L 12/66* (2013.01); *H04L 43/04* (2013.01); *H04L 43/045* (2013.01); *H04L 43/14* (2013.01); *H04L 67/10* (2013.01); *H04L 67/2804* (2013.01); *H04L 67/306* (2013.01); *G05B 2219/31151* (2013.01); *G05B 2219/33148* (2013.01); *Y02P 90/18* (2015.11); *Y02P 90/86* (2015.11)

(58) Field of Classification Search
CPC ......... H04L 67/16; H04L 67/18; H04L 67/42; H04L 43/04; H04L 43/045; H04L 43/14; H04L 65/403; H04L 67/1097; H04L 67/125; H04L 67/22; H04L 67/2804; H04L 41/0896; H04L 63/14; H04L 63/1433
USPC ....................................................... 709/217
See application file for complete search history.

(56) References Cited

U.S. PATENT DOCUMENTS

| | | |
|---|---|---|
| 5,199,009 A | 3/1993 | Svast |
| 5,598,572 A | 1/1997 | Tanikoshi et al. |
| 5,611,059 A | 3/1997 | Benton et al. |
| 5,612,869 A | 3/1997 | Letzt et al. |
| 5,682,460 A | 10/1997 | Hyziak et al. |
| 5,710,885 A | 1/1998 | Bondi |
| 5,844,794 A | 12/1998 | Keeley |
| 5,845,149 A | 12/1998 | Husted et al. |
| 5,856,931 A | 1/1999 | McCasland |
| 5,957,985 A | 9/1999 | Wong et al. |
| 5,966,301 A | 10/1999 | Cook et al. |
| 5,970,430 A | 10/1999 | Burns et al. |
| 5,978,568 A | 11/1999 | Abraham et al. |
| 6,167,337 A | 12/2000 | Haack et al. |
| 6,175,770 B1 | 1/2001 | Bladow |
| 6,175,801 B1 | 1/2001 | Millington |
| 6,199,068 B1 | 3/2001 | Carpenter |
| 6,279,113 B1 | 8/2001 | Vaidya |
| 6,282,455 B1 | 8/2001 | Engdahl |
| 6,324,607 B1 | 11/2001 | Korowitz et al. |
| 6,381,502 B1 | 4/2002 | Rudder et al. |
| 6,400,996 B1 | 6/2002 | Hoffberg et al. |
| 6,412,032 B1 | 6/2002 | Neet et al. |
| 6,437,692 B1 | 8/2002 | Petite et al. |
| 6,457,024 B1 | 9/2002 | Felsentein et al. |
| 6,463,338 B1 | 10/2002 | Neet |
| 6,466,972 B1 | 10/2002 | Paul et al. |
| 6,529,780 B1 | 3/2003 | Soergel et al. |
| 6,535,926 B1 | 3/2003 | Esker |
| 6,578,005 B1 | 6/2003 | Lesaint et al. |
| 6,624,388 B1 | 9/2003 | Blankenship et al. |
| 6,640,145 B2 | 10/2003 | Hoffberg et al. |
| 6,651,062 B2 | 11/2003 | Ghannam et al. |
| 6,675,226 B1 | 1/2004 | Nair et al. |
| 6,686,838 B1 | 2/2004 | Rezvani et al. |
| 6,691,159 B1 | 2/2004 | Grewal et al. |
| 6,705,229 B2 | 3/2004 | Frankenberger |
| 6,708,074 B1 | 3/2004 | Chi et al. |
| 6,708,385 B1 | 3/2004 | Lemelson |
| 6,714,974 B1 | 3/2004 | Machida |
| 6,728,262 B1 | 4/2004 | Woram |
| 6,732,165 B1 | 5/2004 | Jennings, III |
| 6,732,191 B1 | 5/2004 | Baker et al. |
| 6,757,897 B1 | 6/2004 | Shi et al. |
| 6,774,598 B1 | 8/2004 | Kohler et al. |
| 6,801,920 B1 | 10/2004 | Wischinski |
| 6,819,960 B1 | 11/2004 | McKelvey et al. |
| 6,891,850 B1 | 5/2005 | Vandesteeg et al. |
| 6,895,532 B2 | 5/2005 | Raynham |
| 6,904,600 B1 | 6/2005 | James et al. |
| 6,907,302 B2 | 6/2005 | Karbassi |
| 6,920,502 B2 | 7/2005 | Araujo et al. |
| 6,952,680 B1 | 10/2005 | Melby et al. |
| 6,965,802 B2 | 11/2005 | Sexton |
| 6,968,242 B1 | 11/2005 | Hwu et al. |
| 6,970,913 B1 | 11/2005 | Albert et al. |
| 6,982,953 B1 | 1/2006 | Swales |
| 7,032,045 B2 | 4/2006 | Kostadinov |
| 7,085,814 B1 | 8/2006 | Gandhi et al. |
| 7,103,428 B2 | 9/2006 | Varone et al. |
| 7,133,900 B1 | 11/2006 | Szeto |
| 7,149,792 B1 | 12/2006 | Hansen et al. |
| 7,151,966 B1 | 12/2006 | Baier et al. |
| 7,203,560 B1 | 4/2007 | Wylie et al. |
| 7,210,095 B1 | 4/2007 | Mor |
| 7,233,830 B1 | 6/2007 | Callaghan et al. |
| 7,242,009 B1 | 7/2007 | Wilson et al. |
| 7,275,037 B2 | 9/2007 | Lauer |
| 7,277,865 B1 | 10/2007 | Silverstone et al. |
| 7,289,994 B2 | 10/2007 | Nixon et al. |
| 7,298,275 B2 | 11/2007 | Brandt et al. |
| 7,310,344 B1 | 12/2007 | Sue |
| 7,383,155 B2 | 6/2008 | Rosam et al. |
| 7,412,548 B2 | 8/2008 | Sichner |
| 7,428,495 B2 | 9/2008 | Dhar et al. |
| 7,478,010 B2 | 1/2009 | Hashemian |
| 7,480,728 B2 | 1/2009 | Evans |
| 7,539,724 B1 | 5/2009 | Callaghan |
| 7,734,590 B2 | 6/2010 | Chand et al. |
| 7,827,122 B1 | 11/2010 | Campbell, Jr. et al. |
| 7,831,317 B2 | 11/2010 | McGreevy et al. |
| 8,150,959 B1 | 4/2012 | Bezdicek et al. |
| 8,266,066 B1 | 9/2012 | Wezter et al. |
| 8,353,012 B2 | 1/2013 | Del Real |
| 8,392,845 B2 | 3/2013 | Cahill et al. |
| 8,451,753 B2 | 5/2013 | Vanga et al. |
| 8,468,272 B2 | 6/2013 | Giroti |
| 8,686,871 B2 | 4/2014 | Jensen et al. |
| 8,924,328 B1 | 12/2014 | Kozlovsky et al. |
| 9,024,955 B2 | 5/2015 | Ramarao et al. |
| 9,117,076 B2 | 8/2015 | Devost |
| 9,438,648 B2 | 9/2016 | Asenjo et al. |
| 9,507,807 B1 | 11/2016 | Florissi et al. |
| 9,685,053 B2 | 6/2017 | Palmeri |
| 9,690,669 B2 | 6/2017 | Bernal et al. |
| 10,026,049 B2 | 7/2018 | Asenjo et al. |
| 10,054,914 B2 | 8/2018 | Vartiainen et al. |
| 2001/0035729 A1 | 11/2001 | Graiger et al. |
| 2002/0004798 A1 | 1/2002 | Babula et al. |
| 2002/0016839 A1 | 2/2002 | Smith |
| 2002/0042756 A1 | 4/2002 | Kumar et al. |
| 2002/0046239 A1 | 4/2002 | Stawikowski et al. |
| 2002/0049833 A1 | 4/2002 | Kikinis |
| 2002/0065898 A1 | 5/2002 | Leontiev et al. |
| 2002/0068983 A1 | 6/2002 | Sexton |
| 2002/0068984 A1 | 6/2002 | Alexander et al. |

(56) References Cited

U.S. PATENT DOCUMENTS

| | | |
|---|---|---|
| 2002/0073236 A1 | 6/2002 | Helgeson et al. |
| 2002/0077711 A1 | 6/2002 | Nixon et al. |
| 2002/0078432 A1 | 6/2002 | Charisius et al. |
| 2002/0082966 A1 | 6/2002 | O'Brien et al. |
| 2002/0094588 A1 | 7/2002 | Fan et al. |
| 2002/0096077 A1 | 7/2002 | Frankenberger |
| 2002/0107904 A1 | 8/2002 | Talluri et al. |
| 2002/0138378 A1 | 9/2002 | Leskuski |
| 2002/0156872 A1 | 10/2002 | Brown |
| 2002/0156926 A1 | 10/2002 | Batke et al. |
| 2002/0161745 A1 | 10/2002 | Call |
| 2002/0169993 A1 | 11/2002 | Woods et al. |
| 2003/0004937 A1 | 1/2003 | Salmenkaita et al. |
| 2003/0009253 A1 | 1/2003 | McIntyre et al. |
| 2003/0009572 A1 | 1/2003 | Thurner |
| 2003/0011467 A1 | 1/2003 | Suomela |
| 2003/0014149 A1 | 1/2003 | Kreidler et al. |
| 2003/0023336 A1 | 1/2003 | Kreidler et al. |
| 2003/0033179 A1 | 2/2003 | Katz et al. |
| 2003/0041089 A1 | 2/2003 | Mauro |
| 2003/0051074 A1 | 3/2003 | Edwards |
| 2003/0056224 A1 | 3/2003 | Stone |
| 2003/0105535 A1 | 6/2003 | Rammler |
| 2003/0105585 A1 | 6/2003 | Ukita |
| 2003/0109942 A1 | 6/2003 | Yeh et al. |
| 2003/0120817 A1 | 6/2003 | Ott et al. |
| 2003/0156639 A1 | 8/2003 | Liang |
| 2003/0167238 A1 | 9/2003 | Zeif |
| 2003/0167449 A1 | 9/2003 | Warren et al. |
| 2003/0177169 A1 | 9/2003 | Nutt et al. |
| 2003/0177201 A1 | 9/2003 | Shen |
| 2003/0198188 A1 | 10/2003 | Castlebury et al. |
| 2003/0208545 A1 | 11/2003 | Eaton et al. |
| 2003/0217100 A1 | 11/2003 | Kronk |
| 2003/0224769 A1 | 12/2003 | Solve et al. |
| 2003/0236576 A1 | 12/2003 | Resnick et al. |
| 2004/0024572 A1 | 2/2004 | Pagnano et al. |
| 2004/0025173 A1 | 2/2004 | Levonai et al. |
| 2004/0032935 A1 | 2/2004 | Mills et al. |
| 2004/0083165 A1 | 4/2004 | Lawrence |
| 2004/0111512 A1 | 6/2004 | Barth |
| 2004/0148039 A1 | 7/2004 | Farchmin et al. |
| 2004/0148187 A1 | 7/2004 | Boettcher et al. |
| 2004/0148383 A1 | 7/2004 | Gonsalves |
| 2004/0159113 A1 | 8/2004 | Singh et al. |
| 2004/0199573 A1 | 10/2004 | Schwartz et al. |
| 2004/0203895 A1 | 10/2004 | Balasuriya |
| 2004/0214566 A1 | 10/2004 | Suzuki et al. |
| 2004/0215551 A1 | 10/2004 | Eder |
| 2004/0225629 A1 | 11/2004 | Eder |
| 2004/0267729 A1 | 12/2004 | Swaminathan et al. |
| 2005/0005093 A1 | 1/2005 | Bartels et al. |
| 2005/0021158 A1 | 1/2005 | De meyer et al. |
| 2005/0038528 A1 | 2/2005 | McKelvey et al. |
| 2005/0055429 A1 | 3/2005 | Abele et al. |
| 2005/0080799 A1 | 4/2005 | Harnden et al. |
| 2005/0091410 A1 | 4/2005 | Gibart et al. |
| 2005/0120112 A1 | 6/2005 | Wing et al. |
| 2005/0125441 A1 | 6/2005 | Clemens et al. |
| 2005/0137735 A1 | 6/2005 | Loy et al. |
| 2005/0149922 A1 | 7/2005 | Vincent |
| 2005/0203869 A1 | 9/2005 | Minamino et al. |
| 2005/0209902 A1 | 9/2005 | Iwasaki et al. |
| 2005/0257204 A1 | 11/2005 | Bryant et al. |
| 2005/0278441 A1 | 12/2005 | Bond et al. |
| 2006/0022048 A1 | 2/2006 | Johnson |
| 2006/0046712 A1 | 3/2006 | Shamp et al. |
| 2006/0077095 A1 | 4/2006 | Tucker et al. |
| 2006/0078859 A1 | 4/2006 | Mullin |
| 2006/0149813 A1 | 7/2006 | Janik |
| 2006/0153089 A1 | 7/2006 | Silverman |
| 2006/0173873 A1 | 8/2006 | Prompt et al. |
| 2006/0190106 A1* | 8/2006 | Kay ................ G05B 19/042 700/86 |
| 2006/0236374 A1 | 10/2006 | Hartman |
| 2006/0253205 A1 | 11/2006 | Gardiner |
| 2006/0259472 A1 | 11/2006 | MacClellan |
| 2006/0282432 A1 | 12/2006 | Cassidy et al. |
| 2007/0008129 A1 | 1/2007 | Soliman |
| 2007/0019641 A1 | 1/2007 | Pai et al. |
| 2007/0021968 A1 | 1/2007 | Amir et al. |
| 2007/0050206 A1 | 3/2007 | Whikehart et al. |
| 2007/0061018 A1* | 3/2007 | Callaghan .......... G05B 19/05 700/1 |
| 2007/0073850 A1 | 3/2007 | Callaghan et al. |
| 2007/0078525 A1 | 4/2007 | Chand |
| 2007/0078536 A1 | 4/2007 | Gordon et al. |
| 2007/0078862 A1 | 4/2007 | Chand et al. |
| 2007/0095907 A1 | 5/2007 | Robinson et al. |
| 2007/0112801 A1 | 5/2007 | McGreevy et al. |
| 2007/0118560 A1 | 5/2007 | Bornhoevd et al. |
| 2007/0130112 A1 | 6/2007 | Lin |
| 2007/0168057 A1 | 7/2007 | Blevins et al. |
| 2007/0192213 A1 | 8/2007 | Wu et al. |
| 2007/0194097 A1 | 8/2007 | Jones |
| 2007/0213989 A1 | 9/2007 | Cooksy et al. |
| 2007/0244892 A1* | 10/2007 | Narancic ........ G06F 17/30569 |
| 2007/0245169 A1 | 10/2007 | Farchmin et al. |
| 2007/0247789 A1 | 10/2007 | Benson et al. |
| 2007/0255431 A1 | 11/2007 | Kinsey |
| 2008/0027704 A1 | 1/2008 | Kephart et al. |
| 2008/0049013 A1 | 2/2008 | Nasle |
| 2008/0065243 A1 | 3/2008 | Fallman et al. |
| 2008/0077512 A1 | 3/2008 | Grewal |
| 2008/0082186 A1* | 4/2008 | Hood ............... G05B 19/042 700/83 |
| 2008/0109099 A1 | 5/2008 | Moshier |
| 2008/0125887 A1 | 5/2008 | Case |
| 2008/0155064 A1 | 6/2008 | Kosuge et al. |
| 2008/0162688 A1 | 7/2008 | Reumann et al. |
| 2008/0189637 A1 | 8/2008 | Krajewski et al. |
| 2008/0208365 A1 | 8/2008 | Grgic et al. |
| 2008/0209211 A1 | 8/2008 | Grgic et al. |
| 2008/0214104 A1 | 9/2008 | Baumert et al. |
| 2008/0263514 A1 | 10/2008 | DeMesa et al. |
| 2008/0303472 A1 | 12/2008 | John et al. |
| 2009/0037378 A1 | 2/2009 | Moor et al. |
| 2009/0037872 A1 | 2/2009 | Schnabele et al. |
| 2009/0063258 A1 | 3/2009 | Mueller et al. |
| 2009/0065578 A1 | 3/2009 | Peterson et al. |
| 2009/0083204 A1 | 3/2009 | Baier et al. |
| 2009/0086692 A1 | 4/2009 | Chen |
| 2009/0088875 A1 | 4/2009 | Baier et al. |
| 2009/0089032 A1 | 4/2009 | Sturrock et al. |
| 2009/0089233 A1 | 4/2009 | Gach et al. |
| 2009/0089359 A1 | 4/2009 | Siorek et al. |
| 2009/0089682 A1 | 4/2009 | Baier et al. |
| 2009/0109889 A1 | 4/2009 | Budampati et al. |
| 2009/0125460 A1 | 5/2009 | Hewison et al. |
| 2009/0127325 A1 | 5/2009 | Macurek et al. |
| 2009/0182689 A1 | 7/2009 | Chiles et al. |
| 2009/0204234 A1 | 8/2009 | Sustaeta et al. |
| 2009/0210071 A1 | 8/2009 | Agrusa et al. |
| 2009/0210814 A1 | 8/2009 | Agrusa et al. |
| 2009/0216341 A1 | 8/2009 | Enkerud et al. |
| 2009/0300151 A1 | 12/2009 | Friedman et al. |
| 2009/0316977 A1 | 12/2009 | Juncker et al. |
| 2010/0010859 A1 | 1/2010 | Ratakonda et al. |
| 2010/0023562 A1 | 1/2010 | Kreuch et al. |
| 2010/0057660 A1 | 3/2010 | Kato |
| 2010/0076575 A1 | 3/2010 | Vasko et al. |
| 2010/0082127 A1 | 4/2010 | Plache et al. |
| 2010/0082129 A1 | 4/2010 | McGreevy et al. |
| 2010/0082453 A1 | 4/2010 | Speers et al. |
| 2010/0082669 A1* | 4/2010 | Obitko ................ G05B 21/02 707/770 |
| 2010/0083232 A1 | 4/2010 | Chouinard et al. |
| 2010/0118895 A1 | 5/2010 | Radulescu |
| 2010/0146014 A1 | 6/2010 | Ionescu et al. |
| 2010/0153487 A1 | 6/2010 | Greven et al. |
| 2010/0192144 A1 | 7/2010 | Schmit |
| 2010/0211509 A1 | 8/2010 | Jacobs |
| 2010/0219950 A1 | 9/2010 | Kong et al. |
| 2010/0223212 A1 | 9/2010 | Manolescu et al. |

(56) References Cited

U.S. PATENT DOCUMENTS

| | | |
|---|---|---|
| 2010/0241260 A1 | 9/2010 | Kilibarda et al. |
| 2010/0256795 A1 | 10/2010 | McLaughlin et al. |
| 2010/0257227 A1 | 10/2010 | McLaughlin et al. |
| 2010/0257228 A1 | 10/2010 | Staggs et al. |
| 2010/0306377 A1 | 12/2010 | DeHaan et al. |
| 2010/0318392 A1 | 12/2010 | Cassels et al. |
| 2010/0318837 A1 | 12/2010 | Murphy et al. |
| 2010/0324855 A1 | 12/2010 | Parker |
| 2010/0332008 A1 | 12/2010 | Knipfer et al. |
| 2011/0016058 A1 | 1/2011 | Pinchuk |
| 2011/0035253 A1 | 2/2011 | Mason et al. |
| 2011/0047230 A1 | 2/2011 | McGee |
| 2011/0078300 A9 | 3/2011 | Grelewicz et al. |
| 2011/0093308 A1 | 4/2011 | Majeed |
| 2011/0161378 A1 | 6/2011 | Williamson |
| 2011/0173127 A1 | 7/2011 | Ho et al. |
| 2011/0257766 A1 | 10/2011 | Sundaram et al. |
| 2011/0276498 A1 | 11/2011 | Madhok |
| 2012/0005242 A1 | 1/2012 | Feng et al. |
| 2012/0054246 A1 | 3/2012 | Fischer |
| 2012/0072597 A1 | 3/2012 | Teather et al. |
| 2012/0079461 A1 | 3/2012 | Copass et al. |
| 2012/0083906 A1 | 4/2012 | Weatherhead et al. |
| 2012/0084400 A1 | 4/2012 | Almadi et al. |
| 2012/0089920 A1 | 4/2012 | Eick |
| 2012/0095808 A1 | 4/2012 | Kattapuram et al. |
| 2012/0101801 A1 | 4/2012 | Van Dorsselaer |
| 2012/0147894 A1 | 6/2012 | Mulligan et al. |
| 2012/0232876 A1 | 9/2012 | Misra |
| 2012/0257544 A1 | 10/2012 | Schein et al. |
| 2012/0262069 A1 | 10/2012 | Reed |
| 2012/0290104 A1 | 11/2012 | Holt et al. |
| 2012/0297249 A1 | 11/2012 | Yang et al. |
| 2012/0304007 A1 | 11/2012 | Hanks et al. |
| 2012/0306620 A1 | 12/2012 | Karaffa et al. |
| 2013/0004281 A1 | 1/2013 | Anders et al. |
| 2013/0012220 A1 | 1/2013 | Waris et al. |
| 2013/0018696 A1 | 1/2013 | Meldrum |
| 2013/0024542 A1 | 1/2013 | Keller et al. |
| 2013/0031158 A1 | 1/2013 | Salsburg |
| 2013/0036198 A1 | 2/2013 | Galm et al. |
| 2013/0041705 A1 | 2/2013 | Hampapur et al. |
| 2013/0097563 A1 | 4/2013 | Pacheco Rodrigues Velho et al. |
| 2013/0097710 A1 | 4/2013 | Basavapatna et al. |
| 2013/0104236 A1 | 4/2013 | Ray et al. |
| 2013/0107772 A1 | 5/2013 | Splitz et al. |
| 2013/0111034 A1 | 5/2013 | Upadhya |
| 2013/0117064 A1 | 5/2013 | Sadeghi et al. |
| 2013/0117806 A1 | 5/2013 | Parthasarathy et al. |
| 2013/0125233 A1 | 5/2013 | Bush et al. |
| 2013/0138812 A1 | 5/2013 | Assuncao et al. |
| 2013/0138818 A1 | 5/2013 | Wolf |
| 2013/0145033 A1 | 6/2013 | Polla et al. |
| 2013/0159500 A1 | 6/2013 | Reus et al. |
| 2013/0182107 A1 | 7/2013 | Anderson |
| 2013/0191106 A1 | 7/2013 | Kephart et al. |
| 2013/0204982 A1 | 8/2013 | Kim et al. |
| 2013/0211546 A1 | 8/2013 | Lawson et al. |
| 2013/0211547 A1 | 8/2013 | Buchdunger et al. |
| 2013/0211559 A1 | 8/2013 | Lawson et al. |
| 2013/0211870 A1 | 8/2013 | Lawson et al. |
| 2013/0212420 A1 | 8/2013 | Lawson et al. |
| 2013/0212521 A1 | 8/2013 | Fedoseyeva et al. |
| 2013/0218971 A1 | 8/2013 | Sasaki et al. |
| 2013/0237204 A1 | 9/2013 | Buck et al. |
| 2013/0257627 A1 | 10/2013 | Rafael |
| 2013/0262654 A1 | 10/2013 | Masli et al. |
| 2013/0283265 A1 | 10/2013 | Acharya et al. |
| 2013/0304237 A1 | 11/2013 | Schroeder et al. |
| 2013/0325545 A1 | 12/2013 | Mordvinova et al. |
| 2013/0347003 A1 | 12/2013 | Whitmore |
| 2014/0013100 A1 | 1/2014 | Menzel et al. |
| 2014/0046618 A1 | 2/2014 | Arunachalam et al. |
| 2014/0046977 A1 | 2/2014 | Gopalakrishnan et al. |
| 2014/0047107 A1 | 2/2014 | Maturana et al. |
| 2014/0052499 A1 | 2/2014 | Wagner et al. |
| 2014/0059056 A1 | 2/2014 | Chaney et al. |
| 2014/0081691 A1 | 3/2014 | Wendell |
| 2014/0095231 A1 | 4/2014 | Cherusseri et al. |
| 2014/0095654 A1 | 4/2014 | Finnerty et al. |
| 2014/0121789 A1 | 5/2014 | Brandes et al. |
| 2014/0137257 A1 | 5/2014 | Martinez et al. |
| 2014/0156032 A1 | 6/2014 | Jenkins et al. |
| 2014/0156584 A1 | 6/2014 | Motukuri et al. |
| 2014/0215487 A1 | 7/2014 | Cherkasova et al. |
| 2014/0250153 A1 | 9/2014 | Nixon et al. |
| 2014/0250337 A1 | 9/2014 | Yamaji et al. |
| 2014/0278738 A1 | 9/2014 | Feit et al. |
| 2014/0279201 A1 | 9/2014 | Iyoob et al. |
| 2014/0279641 A1 | 9/2014 | Singh et al. |
| 2014/0279948 A1 | 9/2014 | Mahate et al. |
| 2014/0282015 A1 | 9/2014 | Nixon et al. |
| 2014/0282257 A1 | 9/2014 | Nixon et al. |
| 2014/0297354 A1 | 10/2014 | Kogiso et al. |
| 2014/0306533 A1 | 10/2014 | Paquin et al. |
| 2014/0316794 A1 | 10/2014 | Goll et al. |
| 2014/0335480 A1 | 11/2014 | Asenjo et al. |
| 2014/0336785 A1 | 11/2014 | Asenjo et al. |
| 2014/0336786 A1 | 11/2014 | Asenjo et al. |
| 2014/0336791 A1 | 11/2014 | Asenjo et al. |
| 2014/0336795 A1 | 11/2014 | Asenjo et al. |
| 2014/0337000 A1 | 11/2014 | Asenjo et al. |
| 2014/0358606 A1 | 12/2014 | Hull |
| 2014/0372347 A1 | 12/2014 | Cohen et al. |
| 2015/0012763 A1 | 1/2015 | Cohen et al. |
| 2015/0019191 A1 | 1/2015 | Maturana et al. |
| 2015/0032242 A1 | 1/2015 | Schouwenburg et al. |
| 2015/0032886 A1 | 1/2015 | Wang |
| 2015/0048952 A1 | 2/2015 | Murphy |
| 2015/0235161 A1 | 8/2015 | Azar et al. |
| 2015/0278407 A1 | 10/2015 | Vennelakanti et al. |
| 2015/0304193 A1 | 10/2015 | Ishii et al. |
| 2015/0378356 A1 | 12/2015 | Hefeeda et al. |
| 2016/0154693 A1 | 6/2016 | Uhde et al. |
| 2016/0217378 A1 | 7/2016 | Bellala et al. |
| 2016/0217410 A1 | 7/2016 | Santos et al. |
| 2017/0019483 A1 | 1/2017 | Maturana et al. |
| 2017/0236391 A1 | 8/2017 | Palmeri |
| 2018/0157995 A1 | 6/2018 | O'Malley |
| 2018/0205803 A1 | 7/2018 | Asenjo et al. |

FOREIGN PATENT DOCUMENTS

| | | |
|---|---|---|
| CN | 1690685 A | 11/2005 |
| CN | 1833424 A | 9/2006 |
| CN | 100362442 C | 1/2008 |
| CN | 101114160 | 1/2008 |
| CN | 101326471 A | 12/2008 |
| CN | 101536002 | 9/2009 |
| CN | 101739007 | 6/2010 |
| CN | 101776862 A | 7/2010 |
| CN | 102435870 A | 5/2012 |
| CN | 102449567 | 5/2012 |
| CN | 102640475 A | 8/2012 |
| CN | 102830666 A | 12/2012 |
| CN | 102927937 | 2/2013 |
| CN | 103019102 | 4/2013 |
| CN | 103403753 A | 11/2013 |
| CN | 104142629 A | 11/2014 |
| CN | 104142630 A | 11/2014 |
| CN | 104142662 A | 11/2014 |
| CN | 104142664 A | 11/2014 |
| CN | 104142679 A | 11/2014 |
| DE | 19834456 | 2/2000 |
| DE | 10 2014 102 844 A1 | 9/2014 |
| EP | 1209558 | 5/2002 |
| EP | 1 491 977 A2 | 12/2004 |
| EP | 1531373 | 5/2005 |
| EP | 1686442 | 8/2006 |
| EP | 1 868 152 A1 | 12/2007 |
| EP | 1933214 | 6/2008 |
| EP | 2189900 | 5/2010 |
| EP | 2293164 | 3/2011 |
| EP | 2453326 | 5/2012 |

(56) References Cited

FOREIGN PATENT DOCUMENTS

| EP | 2469466 | 6/2012 |
|---|---|---|
| EP | 2 509 042 A1 | 10/2012 |
| EP | 2 660 667 A2 | 11/2013 |
| EP | 2 704 401 A1 | 3/2014 |
| EP | 2 778 816 A1 | 9/2014 |
| EP | 2 790 101 A1 | 10/2014 |
| EP | 2 801 935 A1 | 11/2014 |
| EP | 2 801 936 A1 | 11/2014 |
| EP | 2801938 | 11/2014 |
| EP | 2801940 | 11/2014 |
| EP | 2801941 | 11/2014 |
| EP | 3 037 901 A2 | 6/2016 |
| EP | 3 070 550 B1 | 7/2018 |
| JP | 2001-242931 A | 9/2001 |
| WO | 0111586 | 2/2001 |
| WO | 0169329 | 9/2001 |
| WO | 0217131 | 2/2002 |
| WO | 02/057856 A2 | 7/2002 |
| WO | 03/007097 A1 | 1/2003 |
| WO | 03058506 | 7/2003 |
| WO | 2008133715 | 11/2008 |
| WO | 2009046095 | 4/2009 |
| WO | 2011050482 | 5/2011 |
| WO | 2013007866 | 1/2013 |
| WO | 2014/090310 A1 | 6/2014 |
| WO | 2016/001718 A1 | 1/2016 |

OTHER PUBLICATIONS

Office Action for U.S. Appl. No. 14/087,821 dated Sep. 7, 2017, 63 pages.
Final Office Action for U.S. Appl. No. 14/087,730 dated Aug. 18, 2017, 72 pages.
Office Action for U.S. Appl. No. 15/214,583 dated Aug. 28, 2017, 80 pages.
Final Office Action for U.S. Appl. No. 14/658,345 dated Sep. 25, 2017, 52 pages.
Office Action for European Patent Application Serial No. 16160604.1-1802, dated May 17, 2017, 6 pages.
Office Action for U.S. Appl. No. 14/658,365, dated Mar. 23, 2017, 100 pages.
Chinese Office Action for CN Application Serial No. 201410196150.4, dated Mar. 2, 2017, 37 pages (with English Translation).
Office Action for U.S. Appl. No. 14/087,970, dated Apr. 12, 2017, 59 pages.
Office Action for U.S. Appl. No. 14/658,394, dated Apr. 21, 2017, 97 pages.
Office Action for U.S. Appl. No. 15/388,260, dated Apr. 24, 2017, 101 pages.
Office Action for U.S. Appl. No. 14/658,345, dated Mar. 17, 2017, 95 pages.
Office Action for U.S. Appl. No. 14/658,327, dated May 1, 2017, 99 pages.
Examiner Answer to Appeal Brief for U.S. Appl. No. 14/087,977, dated Feb. 1, 2017.
Givehchi, et al., "Control-as-a-Service from the Cloud: A Case Study for using Virtualized PLCs," 2014 10th IEEE Workshop on Factory Communication Systems (WFCS 2014), May 5, 2014 IEEE, 4 pages.
Office Action for U.S. Appl. No. 14/088,011, dated May 17, 2017.
Rouse, et al. "Definition Industrial Control System (ICS," whatis.techtarget.com, ed. Mar. 2016 (accessed from <<http://whatis.techtarget.com/definition/industrial-control-system-ICS>> on Jan. 11, 2017).
Non-Final Office Action for U.S. Appl. No. 14/087,730, dated Feb. 9, 2017, 78 pages.
Chinese Office Action for CN Application Serial No. 201410198289.2, dated Dec. 15, 2016, 21 pages.
Chinese Office Action for CN Application Serial No. 201410196127.5, dated Nov. 30, 2016, 13 pages.
Chinese Office Action for CN Application Serial No. 201410195780.X, dated Feb. 3, 2017, 18 pages.
"Microsoft," "Sharing Outlook 2010 Contact\Notes/Field?", microsoft.com, Jun. 23, 2011 (accessed on Mar. 11, 2016 from http://answers.microsoft.com/en-us/office/forum/office_2010-outlook/sharing-outlook-2010-contactnotes-field/c7e74273-ff60-4da3-a3aa-ccb6cadcd25e?auth=1).
Office Action for U.S. Appl. No. 14/087,970 dated Feb. 12, 2018, 69 pages.
Chinese Office Action for CN Application Serial No. 201410196114.8, dated Dec. 13, 2017, 26 pages.
Final Office Action for U.S. Appl. No. 15/388,260 dated Oct. 18, 2017, 76 pages.
Office Action for U.S. Appl. No. 15/206,744 dated Nov. 6, 2017, 48 pages.
Office Action for U.S. Appl. No. 14/658,327 dated Oct. 30, 2017, 48 pages.
Final Office Action for U.S. Appl. No. 14/658,394 dated Nov. 16, 2017, 49 pages.
Office Action for U.S. Appl. No. 15/490,076 dated Dec. 20, 2017, 37 pages.
Office Action for U.S. Appl. No. 15/278,139 dated Jan. 11, 2018, 103 pages.
Final Office Action for U.S. Appl. No. 14/087,821 dated Dec. 14, 2017, 37 pages.
Final Office Action for U.S. Appl. No. 14/088,011 dated Nov. 22, 2017, 77 pages.
Office Action for U.S. Appl. No. 15/143,733 dated Mar. 8, 2018, 141 pages.
Office Action for U.S. Appl. No. 14/658,327 dated Apr. 10, 2018, 43 pages.
Office Action for U.S. Appl. No. 14/658,345 dated Mar. 14, 2018, 56 pages.
Office Action for U.S. Appl. No. 14/658,365, dated Apr. 5, 2018, 64 pages.
Office Action for U.S. Appl. No. 14/658,394, dated Apr. 6, 2018, 40 pages.
Final Office Action received for U.S. Appl. No. 14/658,345, dated Sep. 13, 2018, 49 pages.
Final Office Action received for U.S. Appl. No. 14/658,365, dated Oct. 16, 2018, 42 pages.
Notice of Allowance received for U.S. Appl. No. 15/923,127 dated Nov. 21, 2018, 85 pages.
Non-Final Office Action received for U.S. Appl. No. 14/658,327 dated Nov. 1, 2018, 58 pages.
Final Office Action received for U.S. Appl. No. 14/658,394 dated Nov. 1, 2018, 51 pages.
Second Office Action received for Chinese Patent Application Serial No. 201610149668.1 dated Oct. 24, 2018, 18 pages (including English Translation).
Second Office Action received for Chinese Patent Application Serial No. 201610149635.7 dated Oct. 24, 2018, 24 pages (including English Translation).
First Office Action received for Chinese Patent Application Serial No. 201610151417.7 dated Sep. 18, 2018, 28 pages (including English Translation).
Final Office Action received for U.S. Appl. No. 15/714,333 dated Oct. 25, 2019, 36 pages.
Non-Final Office Action received for U.S. Appl. No. 15/970,932 dated Nov. 14, 2019, 122 pages.
Final Office Action received for U.S. Appl. No. 14/658,345 dated Nov. 26, 2019, 48 pages.
Final Office Action received for U.S. Appl. No. 14/658,365 dated Nov. 29, 2019, 48 pages.
Non-Final Office Action received for U.S. Appl. No. 10/234,504 dated Oct. 18, 2006, 15 pages.
Final Office Action received for U.S. Appl. No. 10/234,504 dated Feb. 7, 2007, 12 pages.
Final Office Action received for U.S. Appl. No. 10/234,504 dated May 1, 2007, 12 pages.
Non-Final Office Action received for U.S. Appl. No. 10/162,314 dated Dec. 15, 2005, 17 pages.

(56) References Cited

OTHER PUBLICATIONS

Final Office Action received for U.S. Appl. No. 10/162,314 dated Jun. 5, 2006, 23 pages.
Non-Final Office Action received for U.S. Appl. No. 10/162,314 dated Nov. 16, 2006, 20 pages.
Final Office Action received for U.S. Appl. No. 10/162,314 dated Apr. 30, 2007, 35 pages.
Non-Final Office Action received for U.S. Appl. No. 10/162,314 dated Oct. 25, 2007, 28 pages.
Final Office Action received for U.S. Appl. No. 10/162,314 dated May 5, 2008, 31 pages.
Non-Final Office Action received for U.S. Appl. No. 10/161,848 dated Nov. 15, 2005, 15 pages.
Final Office Action received for U.S. Appl. No. 10/161,848 dated Mar. 27, 2006, 13 pages.
Non-Final Office Action received for U.S. Appl. No. 10/161,848 dated Sep. 5, 2006, 15 pages.
Final Office Action received for U.S. Appl. No. 10/161,848 dated Feb. 23, 2007, 17 pages
Non-Final Office Action received for U.S. Appl. No. 10/161,848 dated May 7, 2007, 14 pages.
Final Office Action received for U.S. Appl. No. 10/161,848 dated Oct. 17, 2007, 15 pages.
Non-Final Office Action received for U.S. Appl. No. 10/161,848 dated Feb. 7, 2008, 14 pages.
Final Office Action received for U.S. Appl. No. 10/161,848 dated Sep. 9, 2008, 17 pages.
Non-Final Office Action received for U.S. Appl. No. 12/410,632 dated Feb. 1, 2011, 56 pages.
Final Office Action received for U.S. Appl. No. 12/410,632 dated May 17, 2011, 17 pages.
Non-Final Office Action received for U.S. Appl. No. 12/410,632 dated Sep. 2, 2011, 11 pages.
Non-Final Office Action received for U.S. Appl. No. 10/298,366 dated Apr. 20, 2006, 13 pages.
Final Office Action received for U.S. Appl. No. 10/298,366 dated Sep. 29, 2006, 16 pages.
Non-Final Office Action received for U.S. Appl. No. 10/298,366 dated Jan. 31, 2007, 12 pages.
Final Office Action received for U.S. Appl. No. 10/298,366 dated Jul. 18, 2007, 14 pages.
Non-Final Office Action received for U.S. Appl. No. 10/298,366 dated Dec. 17, 2007, 10 pages.
Non-Final Office Action received for U.S. Appl. No. 10/298,366 dated Jun. 11, 2008, 24 pages.
Final Office Action received for U.S. Appl. No. 10/298,366 dated Nov. 18, 2008, 20 pages.
Notice of Allowance received for U.S. Appl. No. 10/298,366 dated Feb. 2, 2009, 23 pages.
Non-Final Office Action received for U.S. Appl. No. 13/615,195, dated Aug. 19, 2014, 24 pages.
Communication pursuant to Article 96(2) EPC for EP Application Serial No. 03026339.6 dated Apr. 6, 2006, 6 pages.
Communication pursuant to Article 96(2) EPC for EP Application Serial No. 13166670.3 dated Dec. 14, 2018, 4 pages.
Chinese Third Office Action for Chinese Application No. 201410196114.8 dated Apr. 12, 2017, 25 pages (Including English Translation).
Chinese Fourth Office Action for Chinese Application No. 201410196114.8 dated Aug. 15, 2017, 24 pages (Including English Translation).
Chinese Second Office Action for Chinese Application No. 201410196198.5 dated Dec. 21, 2016, 10 pages (Including English Translation).
Chinese Third Office Action for Chinese Application No. 201410196198.5 dated Mar. 28, 2017, 10 pages (Including English Translation).
Chinese Second Office Action for Chinese Application No. 201410196525.7 dated Dec. 21, 2016, 8 pages (Including English Translation).
Chinese Second Office Action for Chinese Application No. 201410196775.0 dated Dec. 7, 2016, 8 pages (Including English Translation).
Chinese Third Office Action for CN Application Serial No. 201410196150.4, dated Nov. 29, 2017, 10 pages (Including English Translation).
Communication pursuant to Article 94(3) EPC for EP Application Serial No. 14167511.6 dated Jan. 23, 2019, 7 pages.
Communication pursuant to Article 94(3) EPC for EP Application Serial No. 14167703.9 dated Jan. 23, 2019, 6 pages.
Anonymous: "Hash function—Wikipedia", Wikipedia, Apr. 19, 2009, URL:https://en.wikipedia.org/w/index.php?title=Hash_function&oldid=284890279, 9 pages.
Communication pursuant to Article 94(3) EPC for EP Application Serial No. 16160611.6 dated Apr. 5, 2017, 5 pages.
Communication pursuant to Article 94(3) EPC for EP Application Serial No. 16160611.6 dated May 10, 2017, 5 pages.
Second Office Action received for Chinese Patent Application Serial No. 201610151417.7 dated Jan. 22, 2019, 7 pages (Including English Translation).
Communication pursuant to Article 94(3) EPC for EP Application Serial No. 16160604.1 dated Jun. 13, 2017, 6 pages.
Summons to attend oral proceedings pursuant to Rule 115(1) EPC received for EP Patent Application Serial No. 14167706.2 dated Dec. 13, 2018, 65 pages.
Second Office Action received for Chinese Patent Application Serial No. 201410196150.4 dated Aug. 3, 2017, 10 pages (Including English Translation).
Extended European Search Report received for EP Patent Application Serial No. 16160610.8 dated Sep. 8, 2016, 9 pages.
Non-Final Office Action received for U.S. Appl. No. 13/725,543 dated Oct. 9, 2014, 10 pages.
Final Office Action received for U.S. Appl. No. 13/725,543 dated May 20, 2015, 15 pages.
Second Office Action received for Chinese Patent Application Serial No. 201710778822.6 dated Sep. 20, 2019, 5 pages.
Supplementary Search Report received for Chinese Patent Application Serial No. 201710339669.7 dated Sep. 18, 2019, 2 pages.
Non-Final Office Action received for U.S. Appl. No. 15/714,333 dated Jul. 17, 2019, 113 pages.
Notice of Allowance received for U.S. Appl. No. 15/621,206 dated Aug. 19, 2019, 52 pages.
Non-Final Office Action received for U.S. Appl. No. 14/658,394 dated Aug. 19, 2019, 70 pages.
First Office Action received for Chinese Patent Application Serial No. 201710778822.6 dated Jun. 24, 2019, 29 pages (Including English Translation).
Second Office Action received for Chinese Patent Application Serial No. 201710339669.7 dated Jul. 2, 2019, 20 pages (Including English Translation).
Final Office Action received for U.S. Appl. No. 13/615,195 dated Jan. 20, 2015, 22 pages.
Chinese First Office Action for Chinese Application No. 20170339669.7 dated Dec. 11, 2018, 25 pages (Including English Translation).
Office Action for U.S. Appl. No. 15/143,733, dated Jun. 18, 2018, 76 pages.
Office Action for U.S. Appl. No. 15/599,921, dated Jun. 29, 2018, 75 pages.
Office Action for U.S. Appl. No. 14/087,970, dated Aug. 1, 2018, 68 pages.
Wikipedia; "PID Controller"; Jul. 20, 2018; https://en.wikipedia.org/wiki/PID_controller (Year: 2018).
Communication pursuant to Article 94(3) EPC for EP Application Serial No. 14167714.6 dated Aug. 3, 2018, 5 pages.
Communication pursuant to Article 94(3) EPC for EP Application Serial No. 14167708.8 dated Aug. 3, 2018, 5 pages.
Communication pursuant to Article 94(3) EPC for EP Application Serial No. 14167712.0 dated Aug. 3, 2018, 5 pages.
Search Report received for Chinese Application Serial No. 201610149668.1 dated Apr. 2, 2018, 1 page.
Search Report received for Chinese Application Serial No. 201610149635.7 dated Apr. 2, 2018, 1 page.

(56) References Cited

OTHER PUBLICATIONS

First Office Action received for Chinese Patent Application Serial No. 201610151380.8 dated Jul. 17, 2018, 65 pages.
Non-Final Office Action received for U.S. Appl. No. 15/621,206 dated Mar. 22, 2019, 118 pages.
Non-Final Office Action received for U.S. Appl. No. 14/658,345 dated May 13, 2019, 78 pages.
Non-Final Office Action received for U.S. Appl. No. 14/658,365 dated Jun. 3, 2019, 70 pages.
Third Office Action received for Chinese Patent Application Serial No. 201610149635.7 dated Apr. 26, 2019, 23 pages (including English Translation).
Notice of Opposition received for EP Patent Application Serial No. 16160611.6 dated Apr. 11, 2019, 789 pages.
Wen et al., "Current Trends and Perspectives in Wireless Virtualization", 2013 International Conference on Selected Topics in Mobile and Wireless Networking (MoWNeT), 2013, 6 pages.
Wang et al., "The Research of Chemical Plant Monitoring Base on the Internet of Things and 3D Visualization Technology", Proceeding of the IEEE International Conference on Information and Automation, Aug. 2013, 5 pages.
European Search Report dated Aug. 11, 2014 for European Application No. 14167714.6-1955, 5 pages.
European Search Report dated Aug. 11, 2014 for European Application No. 14167706.2-1955, 7 pages.
European Search Report dated Aug. 11, 2014 for European Application No. 14167626.2-1955, 9 pages.
European Search Report dated Aug. 11, 2014 for European Application No. 14167627.0-1955, 6 pages.
European Search Report dated Aug. 11, 2014 for European Application No. 14167703.9-1955, 7 pages.
European Search Report dated Aug. 11, 2014 for European Application No. 14167707.0-1955, 7 pages.
European Search Report dated Aug. 11, 2014 for European Application No. 14167708.8-1955, 5 pages.
European Search Report dated Aug. 11, 2014 for European Application No. 14167712.0-1955, 5 pages.
European Search Report dated Aug. 11, 2014 for European Application No. 14167511.6-1955, 6 pages.
Office Action dated Dec. 27, 2004 for U.S. Appl. No. 10/162,315, 8 pages.
Office Action dated Jun. 15, 2005 for U.S. Appl. No. 10/162,315, 9 pages.
Office Action dated Sep. 9, 2005 for U.S. Appl. No. 10/162,315, 10 pages.
Vasudevan, A Web Services Primer, Apr. 4, 2001, XML.com, http://webservices.xml.com/pub/a/ws/2001/04/04/webservices/index.html.
Office Action dated Mar. 6, 2006 for U.S. Appl. No. 10/162,315, 8 pages.
W3C, Web Services Description Language, http://www.w3.org/TR/wsdl, Mar. 15, 2001, 36 pages.
European Search Report dated Mar. 18, 2004 for European Patent Application Serial No. 03026339, 3 Pages.
Compuquest, Inc., SPM-IM-Instant Messaging Client for SpreadMsg Wireless Messaging Software, http://www.compuquestinc.com/spmim.html, Aug. 13, 2002, 4 pages.
Compuquest, Inc., SpreadMsg Lite—Data Capture, Scanning, Extraction & Rule Based Instant Messaging Software, http://web.archive.org/web/20020813080848/ http://www.compuquestinc.com/spmsgl.html, retrieved Jul. 21, 2006, 6 pages.
International Business Machines Corporation, Cross platform instant messaging using web services, Research Disclosure, Kenneth Mason Publications, Hampshire, GB, vol. 458, No. 156, Jun. 2002.
Office Action dated Jun. 18, 2014 for U.S. Appl. No. 13/725,578, 13 pages.
Office Action dated Aug. 19, 2014 for U.S. Appl. No. 13/615,195, 22 pages.
Office Action dated Oct. 9, 2014 for U.S. Appl. No. 13/725,543, 10 pgs.
Office Action dated Dec. 12, 2014 for U.S. Appl. No. 13/725,578, 24 pages.
Office Action dated Jan. 20, 2015 for U.S. Appl. No. 13/615,195, 22 pages.
Third Party Submission under 37 CFR 1.290 dated Nov. 21, 2014 for U.S. Appl. No. 14/087,873, 23 pages.
Office Action for U.S. Appl. No. 13/725,543 dated May 20, 2015, 15 pages.
Office Action for U.S. Appl. No. 13/608,821 dated Jun. 1, 2015, 44 pages.
Office Action for U.S. Appl. No. 13/608,850 dated Jun. 1, 2015, 38 pages.
Office Action for U.S. Appl. No. 13/677,060 dated Apr. 24, 2015, 54 pgs.
Office Action for U.S. Appl. No. 13/725,619 dated Jul. 17, 2015, 45 pages.
Office Action for U.S. Appl. No. 13/725,660 dated Aug. 18, 2015, 90 pgs.
Colombo, A.W., et al., "Factory of the Future: A Service-Oriented System of Modular, Dynamic Reconfigurable and Collaborative Systems," Artificial Intelligence Techniques for Networked Manufacturing Enterprises Management, Springer Series in Advanced Manufacuring 2010, pp. 459-481.
Colombo, Amando Walter, et al., "Towards the Factory of the Future: A Service-Oriented Cross-layer Infrastructure," ICT Shaping the World: A Scientific View, 2009, pp. 65-81.
Notice of Allowance for U.S. Appl. No. 13/725,578, dated Apr. 24, 2015, 23 pages.
Office Action for U.S. Appl. No. 13/677,060, dated Oct. 20, 2015, 48 pages.
Office Action for U.S. Appl. No. 13/615,195, dated Sep. 21, 2015, 19 pages.
Office Action for U.S. Appl. No. 13/725,660, dated Oct. 26, 2015, 79 pages.
Office Action dated Nov. 25, 2015 for U.S. Appl. No. 14/087,873, 57 pages.
Final Office Action for U.S. Appl. No. 13/725,619 dated Dec. 4, 2015, 21 pages.
Final Office Action for U.S. Appl. No. 13/608,821 dated Dec. 7, 2015, 39 pages.
Final Office Action for U.S. Appl. No. 13/615,195, dated Feb. 11, 2016, 19 pages.
Non-Final Office Action for U.S. Appl. No. 13/725,543, dated Feb. 2, 2016, 15 pages.
Non-Final Office Action for U.S. Appl. No. 13/725,660, dated Jan. 21 2016, 72 pages.
Final Office Action for U.S. Appl. No. 13/608,850, dated Dec. 9, 2015, 25 pages.
Office Action dated Nov. 24, 2015 for European Application No. 14167706.2-1955, 8 pages.
Office Action dated Nov. 24, 2015 for European Application No. 14167626.2-1955, 8 pages.
Notice of Allowance for U.S. Appl. No. 13/725,619 dated Mar. 31, 2016, 26 pages.
Non-Final Office Action for U.S. Appl. No. 13/677,060 dated Mar. 10, 2016, 66 pages.
Notice of Allowance for U.S. Appl. No. 13/725,660 dated Feb. 3, 2016, 47 pages.
Non-Final Office Action for U.S. Appl. No. 14/087,730 dated Mar. 11, 2016, 81 pages.
Non-Final Office Action for U.S. Appl. No. 14/087,821 dated Mar. 2, 2016, 86 pages.
Non-Final Office Action for U.S. Appl. No. 14/087,977 dated Mar. 17, 2016, 83 pages.
Recursion Software, "SCADA-Aware Mobile", Frisco, TX, Aug. 29,2012 (accessed from http://www.emsenergyautomation.com/brochures/scada.pdf on Feb. 11, 2016).
Ars Technica, "Windows 7 themes: how to unlock them or create your own", Nov. 12, 2009 (accessed from http://arstechnica.com/information-technology/2009/11/unlock-hidden-windows-7-themesl on Mar. 8, 2016).
Non-Final Office Action for U.S. Appl. No. 14/088,014 dated Mar. 22, 2016, 98 pages.

(56) References Cited

OTHER PUBLICATIONS

"Microsoft," "Sharing Outlook 2010 Contac\Notes/Field?", microsoft.com, Jun. 23, 2011 (accessed on Mar. 11, 2016 from http://answers.microsoft.com/en-us/office/forum/office_2010-outlook/sharing-outlook-2010-contactnotes-field/ 'ffe74273-ff60-4da3-a3aa-ccb6cadcd25e?auth=1).
Notice of Allowance for U.S. Appl. No. 13/608,850 dated Apr. 12, 2016, 37 pages.
Notice of Allowance for U.S. Appl. No. 14/087,873 dated Apr. 18, 2016, 26 pages.
Chinese Office Action for Chinese Application No. 201410196198.5 dated Mar. 29, 2016, 18 pages.
Non-Final Office Action for U.S. Appl. No. 14/088,011 dated May 12, 2016, 96 pages.
Chinese Office Action for Chinese Application No. 201410198289.2 dated Apr. 5, 2016, 18 pages.
Chinese Office Action for Chinese Application No. 201410196905.0 dated Apr. 5, 2016, 20 pages.
Chinese Office Action for Chinese Application No. 201410196127.5 dated Apr. 7, 2016, 13 pages.
Chinese Office Action for Chinese Application No. 201410196775.0 dated May 5, 2016, 14 pages.
Chinese Office Action for Chinese Application No. 201410196525.7 dated May 5, 2016, 13 pages.
Office Action dated Jun. 21, 2016 for U.S. Appl. No. 13/615,195, 27 pages.
Final Office Action dated Jun. 17, 2016 for U.S. Appl. No. 13/725,543, 19 pages.
Office Action dated Jun. 17, 2016 for U.S. Appl. No. 14/087,970, 36 pages.
Chinese Office Action for Chinese Application No. 201410196114.8 dated Apr. 25, 2016, 20 pages.
Office Action dated Sep. 22, 2015 for European Application No. 14167707.0-1955, 9 pages.
Chinese Office Action dated May 26, 2016 for Chinese Application No. 201410195780.X, 16 pages.
Final Office Action U.S. Appl. No. 14/087,977, dated Jul. 13, 2016, 59 pages.
Final Office Action for U.S. Appl. No. 14/088,014, dated Jul. 15, 2016, 65 pages.
Non-Final Office Action for U.S. Appl. No. 14/087,922, dated Jul. 19, 2016, 120 pages.
Extended European Search Report for European Patent Application Serial No. 16160604.1, dated Aug. 17, 2016, 9 pages.
Extended European Search Report for EP Patent Application Serial No. 16160611.6, dated Aug. 24, 2016, 10 pages.
Final Office Action for U.S. Appl. No. 14/087,730, dated Aug. 24, 2016, 113 pages.
Extended European Search Report for EP Patent Application Serial No. 16160602.5, dated Sep. 2, 2016, 9 pages.
"Cloud Computing," Whatis.com, Oct. 27, 2009, http://searchcloudcomputing.techtarget.com/sDefinition/0,,sid201_gci1287881,00.html, 2 pages.
Mell, P., et al., "The NIST Definition of Cloud Computing," Oct. 7, 2009, http://csrc.nist.gov/groups/SNS/cloud/computing/index_html, 2 pages.
European Office Action for EP Patent Application Serial No. 16160611.6, dated Sep. 26, 2016, 2 pages.
European Office Action for EP Patent Application Serial No. 13166670.3, dated Jul. 18, 2016, 2 pages.
European Office Action for EP Patent Application Serial No. 16160604.1, dated Sep. 26, 2016, 2 pages.
Office Action for U.S. Appl. No. 13/615,195, dated Oct. 21, 2016, 44 pages.
Office Action for U.S. Appl. No. 14/088,011, dated Nov. 1, 2016, 79 pages.
European Office Action for EP Patent Application Serial No. 16160610.8, dated Oct. 17, 2016, 2 pages.
European Office Action for EP Patent Application Serial No. 16160602.5, dated Oct. 10, 2016, 2 pages.
Office Action for U.S. Appl. No. 14/088,014, dated Nov. 17, 2016, 61 pages.
Chinese Office Action for CN Application Serial No. 201410196114.8, dated Nov. 9, 2016, 19 pages.
Chinese Office Action for CN Application Serial No. 201410196905.0, dated Nov. 18, 2016, 6 pages.
Office Action for U.S. Appl. No. 14/087,922, dated Nov. 25, 2016, 65 pages.
Communication pursuant to Article 94(3) EPC received for EP Patent Application Serial No. 16160602.5 dated May 19 2020, 7 pages.
Communication pursuant to Article 94(3) EPC received for EP Patent Application Serial No. 16160610.8 dated May 27 2020, 8 pages.
Non-Final Office Action received for U.S. Appl. No. 16/129,116 dated Apr. 1, 2020, 142 pages.
Non-Final Office Action received for U.S. Appl. No. 15/714,333 dated Apr. 15, 2020, 44 pages.
Final Office Action received for U.S. Appl. No. 15/970,932 dated Apr. 13, 2020, 37 pages.
Non-Final Office Action received for U.S. Appl. No. 14/658,345 dated May 14, 2020, 83 pages.
Summons to attend oral proceedings pursuant to Rule 115(1) EPC received for EP Patent Application Serial No. 16160611.6 dated Dec. 19, 2019, 26 pages.
Third Office Action received for Chinese Patent Application Serial No. 201710778822.6 dated Mar. 3, 2020, 43 pages. (Including English Translation).
Communication pursuant to Article 94(3) EPC received for EP Patent Application Serial No. 14167627.0 dated Jan. 23, 2020, 6 pages.
Summons to attend oral proceedings pursuant to Rule 115(1) EPC received for EP Patent Application Serial No. dated Feb. 6, 2020, 8 pages.
Notification of Grant of Patent for Invention received for Chinese Patent Application Serial No. 201710339669.7 dated Dec. 31, 2019, 7 pages. (Including English Translation).
Non-Final Office Action received for U.S. Appl. No. 14/658,394 dated Feb. 20, 2020, 67 pages.

\* cited by examiner

FIG. 4

Gateway Configuration File (404)

| FIELD | VALUE |
|---|---|
| SYSTEM ID | #1BLOCKLINE |
| CONTROLLER ID | #1BLOCKLINE:STAGE2 |
| CONTROLLER TAG 1 | [PART_COUNT] |
| CONTROLLER TAG 2 | [MACHINE_MODE] |
| ... | ... |
| CLOUD URL | <HTTP://XXX/XXX/XXX> |
| MAXIMUM LOCAL STORAGE | 500MB |

CLOUD GATEWAY FOR INDUSTRIAL AUTOMATION INFORMATION AND CONTROL SYSTEMS

RELATED APPLICATIONS

This application is a continuation of, and claims priority to, U.S. patent application Ser. No. 13/615,195, filed on Sep. 13, 2012, and entitled "CLOUD GATEWAY FOR INDUSTRIAL AUTOMATION INFORMATION AND CONTROL SYSTEMS," which claims the benefit of U.S. Provisional Patent Application Ser. No. 61/587,531, filed on Feb. 9, 2012, and entitled "INDUSTRIAL AUTOMATION CLOUD COMPUTING SYSTEMS AND METHODS," and U.S. Provisional Patent Application Ser. No. 61/642,964, filed May 4, 2012, and entitled "CLOUD GATEWAY FOR INDUSTRIAL AUTOMATION INFORMATION." This application is also related to U.S. patent application Ser. No. 10/162,315, filed on Jun. 4, 2002 (which issued as U.S. Pat. No. 7,151,966 on Dec. 19, 2006), and entitled "SYSTEM AND METHODLGY PROVIDING OPEN INTERFACE AND DISTRIBUTED PROCESSING IN AN INDUSTRIAL CONTROLLER ENVIRONMENT." The entireties of these applications are incorporated herein by reference.

TECHNICAL FIELD

The subject application relates generally to industrial automation, and, more particularly, to systems and methods for gathering and sending industrial data to a cloud platform.

BACKGROUND

Industrial controllers and their associated I/O devices are central to the operation of modern automation systems. These controllers interact with field devices on the plant floor to control automated processes relating to such objectives as product manufacture, material handling, batch processing, supervisory control, and other such applications. Industrial controllers store and execute user-defined control programs to effect decision-making in connection with the controlled process. Such programs can include, but are not limited to, ladder logic, sequential function charts, function block diagrams, structured text, or other such programming structures.

Because of the large number of system variables that must be monitored and controlled in near real-time, industrial automation systems often generate vast amounts of near real-time data. In addition to production statistics, data relating to machine health, alarm statuses, operator feedback (e.g., manually entered reason codes associated with a downtime condition), electrical or mechanical load over time, and the like are often monitored, and in some cases recorded, on a continuous basis. This data is generated by the many industrial devices that can make up a given automation system, including the industrial controller and its associated I/O, telemetry devices for near real-time metering, motion control devices (e.g., drives for controlling the motors that make up a motion system), visualization applications, lot traceability systems (e.g., barcode tracking), etc. Moreover, since many industrial facilities operate on a 24-hour basis, their associated automation systems can generate a vast amount of potentially useful data at high rates. For an enterprise with multiple plant facilities, the amount of generated automation data further increases.

The large quantity of data generated by modern automation systems makes it possible to apply a broad range of plant analytics to the automation systems and processes that make up an industrial enterprise or business. However, access to the industrial data is typically limited to applications and devices that share a common network with the industrial controllers that collect and generate the data. As such, plant personnel wishing to leverage the industrial data generated by their systems in another application (e.g., a reporting or analysis tool, notification system, visualization application, backup data storage, etc.) are required to maintain such applications on-site using local resources. Moreover, although a given industrial enterprise may comprise multiple plant facilities at geographically diverse locations (or multiple mobile systems having variable locations), the scope of such applications is limited only to data available on controllers residing on the same local network as the application.

The above-described deficiencies of today's industrial control and business systems are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

One or more embodiments of the present disclosure relate to cloud gateway devices and services that can interface industrial systems with a cloud platform. To this end, a cloud gateway can collect industrial data generated by an industrial system, perform optional processing on the industrial data, and push the industrial data to a cloud platform for use by one or more cloud-based services or applications. The cloud gateway can include a device interface configured to receive data from one or more industrial devices (e.g., industrial controllers, telemetry devices, sensors, etc.) through a wired or wireless network connection or direct hardwired connection. The cloud gateway can also include a cloud interface that couples the gateway to a web-based cloud platform, allowing the gateway to exchange data with cloud-based applications and services, such as data processing tools, storage services, remote visualization applications, or other cloud-based services.

In some embodiments, the cloud gateway can transform data collected from the industrial devices into a refined set of data prior to pushing the data to the cloud for storage, analysis, etc. For example, the cloud gateway can filter, prune, re-format, combine, summarize, or compress its data prior to moving the data to the cloud. One or more embodiments of the cloud gateway can also contextualize the industrial data prior to pushing the data to the cloud. This can include tagging the data with contextual metadata, such as a time, a quality indicator, a production area, a machine or process state, personnel identifiers, or other information that provides additional context for the data. The cloud gateway can push this appended contextual data to the cloud together with its associated industrial data, so that the contextualixed data can be leveraged by cloud-based analysis tools to facilitate meaningful analysis of the data.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIG. 4 illustrates an exemplary configuration file for configuring a cloud gateway.

DETAILED DESCRIPTION

Figure 1:
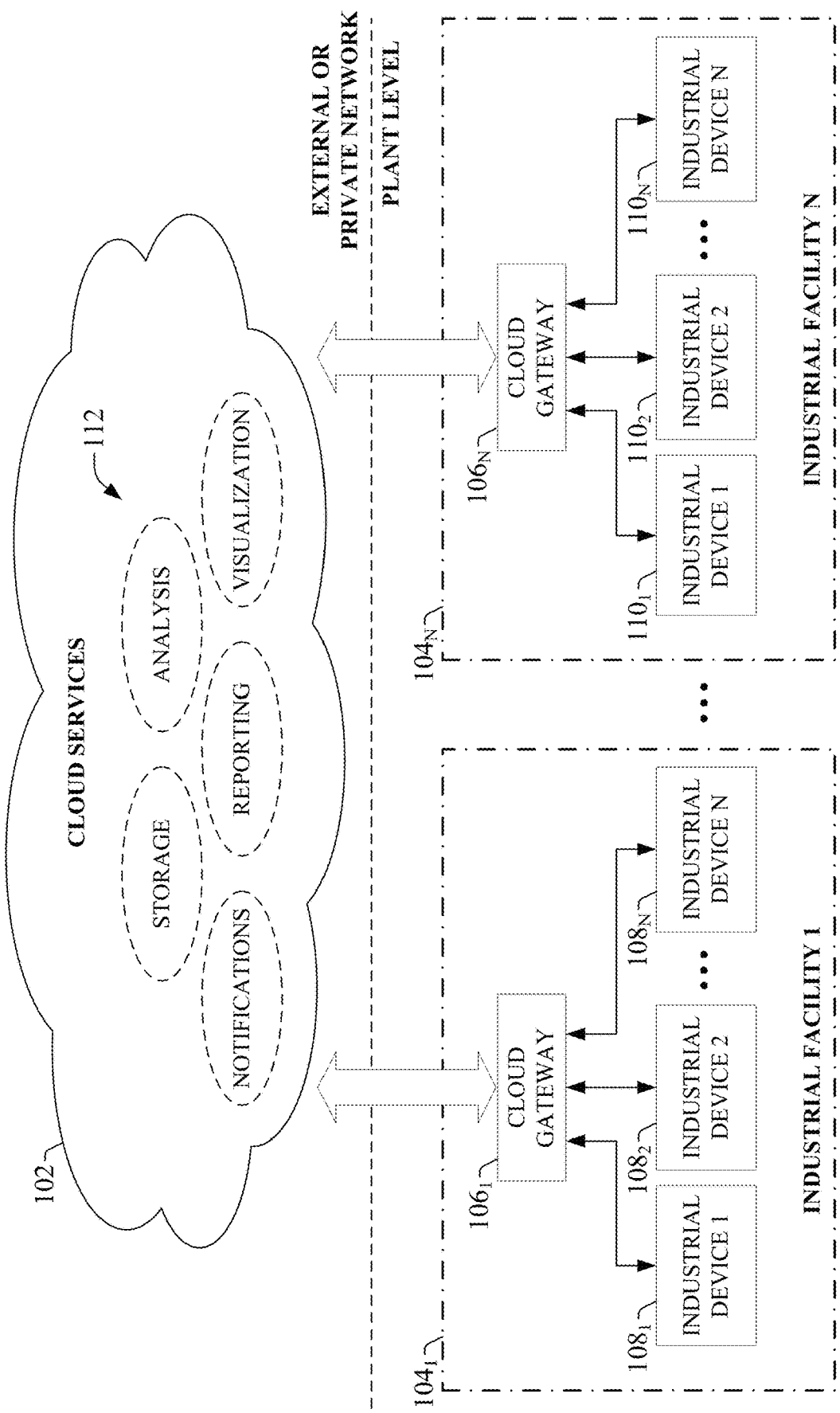
FIG. 1 is a high-level overview of an industrial enterprise that leverages cloud-based services.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a hard disk drive, multiple storage drives (of optical or magnetic storage medium) including affixed (e.g., screwed or bolted) or removably affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

To provide a general context for the cloud gateway devices and services described herein, FIG. 1 illustrates a high-level overview of an industrial enterprise that leverages cloud-based services. The enterprise comprises one or more industrial facilities 104, each having a number of industrial devices 108 and 110 in use. The industrial devices 108 and 110 can make up one or more automation systems operating within the respective facilities 104. Exemplary automation systems can include, but are not limited to, batch control systems (e.g., mixing systems), continuous control systems (e.g., PID control systems), or discrete control systems Industrial devices 108 and 110 can include such devices as industrial controllers (e.g., programmable logic controllers or other types of programmable automation controllers); field devices such as sensors and meters; motor drives; human-machine interfaces (HMIs); industrial robots, barcode markers and readers; vision system devices (e.g., vision cameras); smart welders; or other such industrial devices.

Exemplary automation systems can include one or more industrial controllers that facilitate monitoring and control of their respective processes. The controllers exchange data with the field devices using native hardwired I/O or via a plant network such as Ethernet/IP, Data Highway Plus, ControlNet, Devicenet, or the like. A given controller typically receives any combination of digital or analog signals from the field devices indicating a current state of the devices and their associated processes (e.g., temperature, position, part presence or absence, fluid level, etc.), and executes a user-defined control program that performs automated decision-making for the controlled processes based on the received signals. The controller then outputs appropriate digital and/or analog control signaling to the field devices in accordance with the decisions made by the control program. These outputs can include device actuation signals, temperature or position control signals, operational commands to a machining or material handling robot, mixer control signals, motion control signals, and the like. The control program can comprise any suitable type of code used to process input signals read into the controller and to control output signals generated by the controller, including but not limited to ladder logic, sequential function charts, function block diagrams, structured text, or other such platforms.

Although the exemplary overview illustrated in FIG. 1 depicts the industrial devices 108 and 110 as residing in fixed-location industrial facilities 104, the industrial devices may also be part of a mobile control and/or monitoring application, such as a system contained in a truck or other service vehicle.

According to one or more embodiments of this disclosure, industrial devices 108 and 110 can be coupled to a cloud platform 102 to leverage cloud-based applications. That is, the industrial device 108 and 110 can be configured to discover and interact with cloud-based computing services 112 hosted by cloud platform 102. Cloud platform 102 can be any infrastructure that allows shared computing services 112 to be accessed and utilized by cloud-capable devices. Cloud platform 102 can be a public cloud accessible via the Internet by devices having Internet connectivity and appropriate authorizations to utilize the services 112. In some scenarios, cloud platform 102 can be provided by a cloud provider as a platform-as-a-service (PaaS), and the services 112 can reside and execute on the cloud platform 102 as a cloud-based service. In some such configurations, access to the cloud platform 102 and associated services 112 can be provided to customers as a subscription service by an owner of the services 112. Alternatively, cloud platform 102 can be a private cloud operated internally by the enterprise. An exemplary private cloud platform can comprise a set of servers hosting the cloud services 112 and residing on a corporate network protected by a firewall.

Cloud services 112 can include, but are not limited to, data storage, data analysis, control applications (e.g., applications that can generate and deliver control instructions to industrial devices 108 and 110 based on analysis of near real-time system data or other factors), visualization applications such as cloud-based HMIs, reporting applications, Enterprise Resource Planning (ERP) applications, notification services, or other such applications. If cloud platform 102 is a web-based cloud, industrial devices 108 and 110 at the respective industrial facilities 104 may interact with cloud services 112 via the Internet. In an exemplary configuration, industrial devices 108 and 110 may access the cloud services 112 through separate cloud gateways 106 at the respective industrial facilities 104, where the industrial devices 108 and 110 connect to the cloud gateways 106 through a physical or wireless local area network or radio link. In another exemplary configuration, the industrial devices 108 and 110 may access the cloud platform directly using an integrated cloud gateway service, as will be described in more detail herein.

Providing industrial devices with cloud capability via cloud gateways 106 can offer a number of advantages particular to industrial automation. For one, cloud-based storage offered by the cloud platform 102 can be easily scaled to accommodate the large quantities of data generated daily by an industrial enterprise. Moreover, multiple industrial facilities at different geographical locations can migrate their respective automation data to the cloud platform 102 for aggregation, collation, collective analysis, and enterprise-level reporting without the need to establish a private network between the facilities. Industrial devices 108 and 110 and/or cloud gateways 106 having smart configuration capability can be configured to automatically detect and communicate with the cloud platform 102 upon installation at any facility, simplifying integration with existing cloud-based data storage, analysis, or reporting applications used by the enterprise. In another exemplary application, cloud-based diagnostic applications can access the industrial devices 108 and 110 via cloud gateways 106 to monitor the health of respective automation systems or their associated industrial devices across an entire plant, or across multiple industrial facilities that make up an enterprise. In another example, cloud-based lot control applications can be used to track a unit of product through its stages of production and collect production data for each unit as it passes through each stage (e.g., barcode identifier, production statistics for each stage of production, quality test data, abnormal flags, etc.). These industrial cloud-computing applications are only intended to be exemplary, and the systems and methods described herein are not limited to these particular applications. As these examples demonstrate, the cloud platform 102, working with cloud gateways 106, can allow builders of industrial applications to provide scalable solutions as a service, removing the burden of maintenance, upgrading, and backup of the underlying infrastructure and framework.

Figure 2:
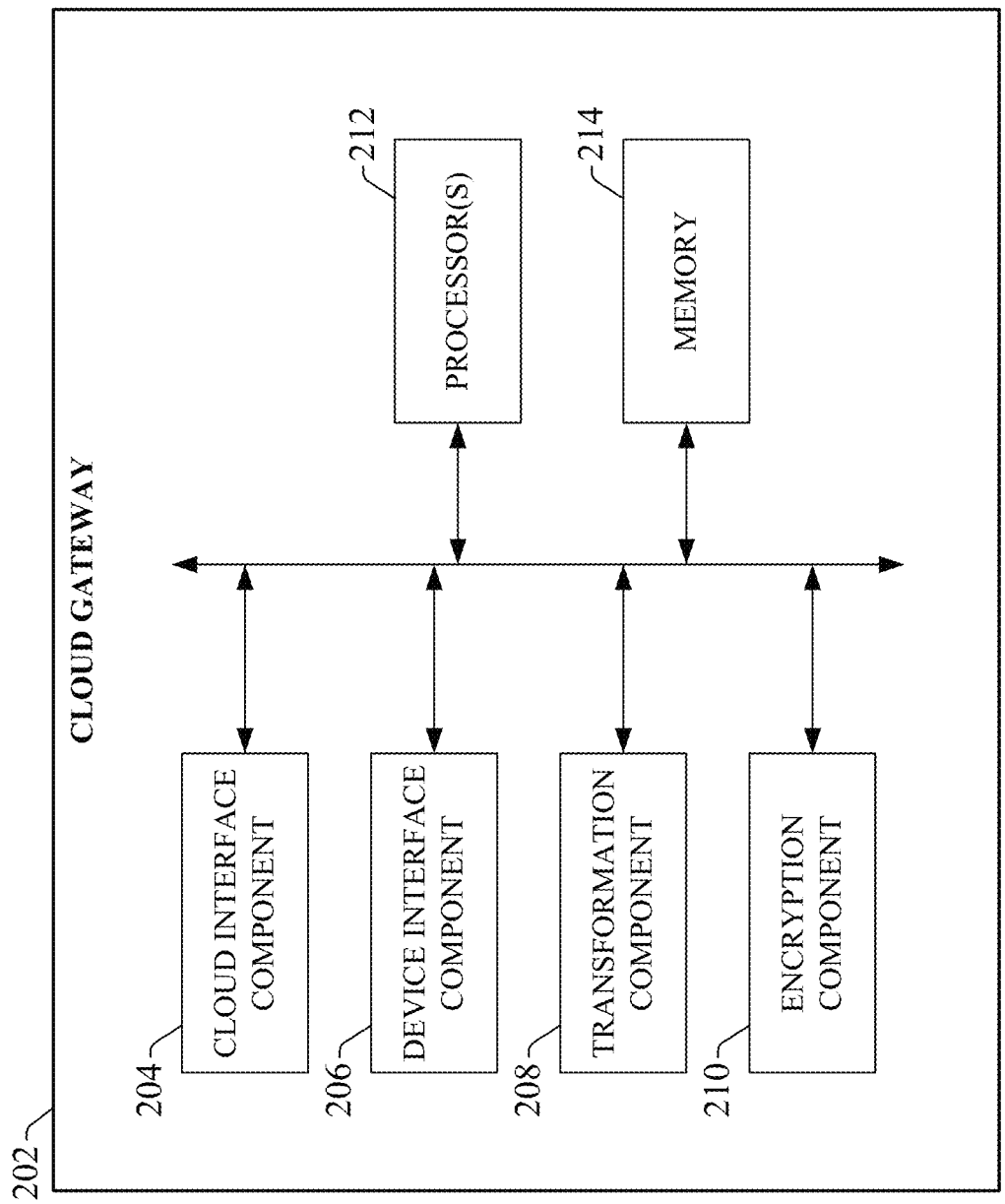
FIG. 2 is a block diagram of an exemplary cloud gateway for collecting industrial data and sending the industrial data to a cloud platform.

FIG. 2 is a block diagram of an exemplary cloud gateway that can be used to collect industrial data and send the industrial data to a cloud platform. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Cloud gateway 202 can include a cloud interface component 204, a device interface component 206, a transformation component 208, an encryption component 210, one or more processors 212, and memory 214. In various embodiments, one or more of the cloud interface component 204, device interface component 206, transformation component 208, encryption component 210, the one or more processors 212, and memory 214 can be electrically and/or communicatively coupled to one another to perform one or more of the functions of the cloud gateway 202. In some embodiments, components 204, 206, 208, and 210 can comprise software instructions stored on memory 214 and executed by processor(s) 212. The cloud gateway 202 may also interact with other hardware and/or software components not depicted in FIG. 2. For example, processor(s) 212 may interact with one or more external user interface devices, such as a keyboard, a mouse, a display monitor, a touchscreen, or other such interface devices.

Cloud interface component 204 can be configured to couple the cloud gateway 102 to a web-based or private cloud platform and exchange data with the cloud platform. Device interface component 206 can be configured to couple the cloud gateway 102 to one or more devices comprising a user's control system (e.g., an industrial controller, meter, sensor, etc.) and exchange data therewith. The data collected by the device interface component 206, and the destination cloud platform to which the data is sent by the cloud interface component 204, can be configured using a local configuration file associated with the cloud gateway 202, as will be described in more detail below.

Transformation component 208 can be configured to transform received industrial data prior to uploading the data to the cloud platform. In some embodiments, the transformation component 208 can contextualize, filter, re-format, combine, summarize, or compress the industrial data to better suit the requirements of the cloud application or to make more efficient use of cloud resources (e.g., bandwidth, storage, etc.). Encryption component 210 can be configured to encrypt the industrial data prior to sending the data to the cloud platform. The one or more processors 212 can perform one or more of the functions described herein with reference to the systems and/or methods disclosed. Memory 214 can be a computer-readable storage medium storing computer-executable instructions and/or information for performing the functions described herein with reference to the systems and/or methods disclosed.

Figure 3:
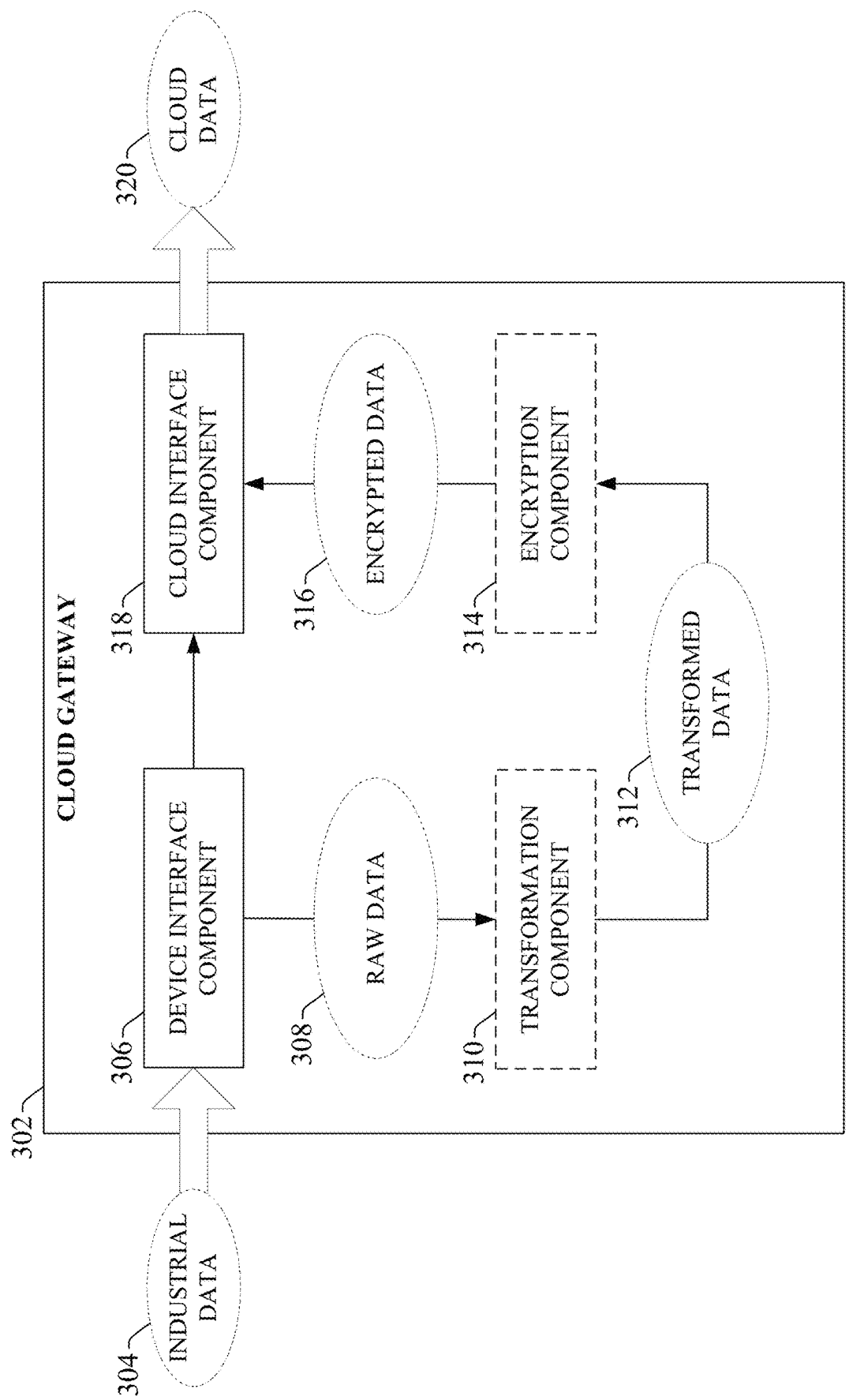
FIG. 3 is a block diagram of an exemplary cloud gateway for receiving industrial data and pushing the data to a cloud platform for use by a cloud-based application.

FIG. 3 illustrates an exemplary cloud gateway capable of receiving industrial data from one or more industrial control systems and pushing the data to a cloud platform for use by a cloud-based application. Device interface component 306 can receive industrial data 304 from one or more industrial devices comprising an industrial automation system. In one or more embodiments, the cloud gateway 302 can reside on the same local area or wireless network as the industrial devices, and retrieve the industrial data 304 over the network. In other embodiments, the cloud gateway 302 can be integrated with an industrial device and run as a service on the device, such that the device interface component 306 retrieves the industrial data 304 from the device locally (e.g., from a data tag or register at the industrial device).

The device interface component 306 can determine which subset of available data is to be retrieved by reading a configuration file associated with the cloud gateway 302. An exemplary configuration file for a cloud gateway is now described with reference to FIG. 4. The gateway configuration file 402 resides locally on its associated cloud gateway, and instructs the cloud gateway as to which data should be collected and sent to the cloud platform, a destination cloud platform for the data, and other such configuration information. Gateway configuration file 402 comprises a number of configurable data fields 404 that allow a user to easily configure the parameters of the cloud gateway. The exemplary gateway configuration file 402 illustrated in FIG. 4 includes fields for the System ID, the Controller ID, one or more controller tags, a cloud URL (uniform resource locator), and a maximum local storage, where the values of the respective fields can be set by the user. It is to be appreciated that the fields illustrated in FIG. 4 are only intended to be exemplary, and that the gateway configuration file 402 may include any suitable set of configuration fields without departing from the scope of this disclosure.

The System ID field can be an identifier of the control system for which the data is to be collected. For example, the System ID can identify a production area, a machine, an assembly line, or other system designation. In another example, the cloud gateway may be used to collect data from a mobile control and/or monitoring system residing on a truck (e.g., a system health monitoring system on a cargo or service vehicle), and the System ID can be a truck identifier. In this way, data from multiple trucks comprising a fleet can be collected using respective cloud gateways on board each truck, and the source of the data can be identified by the cloud application by each cloud gateway's System ID. The System ID field (or a separate field) can also be used to define a communication plug-in that the gateway will use (e.g., Common Industrial Protocol, Modbus, OPC DA/HAD, database, etc.)

The Controller ID field can identify an industrial controller from which the data is to be collected (e.g., a controller associated with the control system identified by the System ID field), and the Controller Tag fields can identify the particular controller tags holding the data. These can include both discrete controller tags containing digital data values as well as analog tags containing integer or real data values. The Cloud URL field can identify the address of the cloud platform to which the data will be sent. The maximum local storage field can be used to configure a maximum amount of local gateway storage space that is to be used for local data storage when communication to the cloud platform has been lost, as will be described in more detail below.

Configuration file 402 can also include communication parameters defining collection and transmission intervals, store-and-forward preferences, and other such configuration information. For, example, configuration file 402 may define an upload interval, a data collection interval, a number of messages per packet, an inactivity timeout duration, a maximum number of uploads per minute, etc.

In some embodiments, the gateway configuration file 402 can be updated remotely from the cloud platform. In such embodiments, the cloud platform can maintain a most recent version of a configuration file that can be distributed to appropriate gateway devices that do not have local versions of the configuration file. For example, when a cloud gateway initially connects to the cloud platform, a version comparison is made between the gateway's local configuration data and the most recent configuration data maintained on the cloud platform to determine whether the configuration data at the cloud gateway is out of data (e.g., based on a comparison of time/date stamps associated with the respective configuration files, a comparison of version numbers, etc.) This comparison can be made at either the cloud platform or locally at the gateway. If this comparison determines that the gateway holds an older version of the configuration data, the most recent configuration data can be downloaded from the cloud platform to the cloud gateway.

Returning now to FIG. 3, device interface component 306 collects the industrial data 304 from the controller tags identified in the cloud gateway's configuration file (e.g., configuration file 402 of FIG. 4). For example, the device interface component can periodically poll the identified controller tags over the network and retrieve the data stored therein. In some embodiments, the device interface component 306 may also monitor the specified controller tags on a continuous basis. If the industrial data is to be sent to the cloud platform without performing additional transformation or encryption on the data, the device interface component 306 can pass the data to the cloud interface component 318, which pushes the data to the cloud platform (e.g., the cloud platform identified by the configuration file) as cloud data 320.

In one or more embodiments, the cloud interface component 318 can send the data to the cloud platform according to communication parameters defined in the gateway's configuration file. Alternatively, the gateway's upload frequency can be set by the cloud application to which the cloud data 320 is being sent. For example, an administrator of the cloud-based application can define an upload frequency, an upload interval, a number of messages per packet, an inactivity timeout, a maximum number of uploads per minute, etc., and the cloud application can provide a corresponding instruction to the cloud gateway 302 (via cloud interface component 318) configuring the communication parameters accordingly. Alternatively or in addition, the cloud-based application may dynamically select a suitable upload frequency for the cloud gateway 302 during operation. For example, in order to control costs associated with cloud resource usage, an administrator of the cloud-based application may configure a maximum total bandwidth usage for the cloud-based application, such that the total instantaneous bandwidth usage for data traffic between the cloud gateway 302 and the cloud platform is not to exceed the configured maximum bandwidth. In such embodiments, the cloud-based application can monitor the total bandwidth utilization substantially in real-time, and dynamically reduce the upload frequency of the cloud gateway 302 in response to a determination that the total bandwidth usage is approaching the defined maximum bandwidth. In another example, an administrator can configure a limit on the total amount of cloud storage to be used for historical data collection. Accordingly, if the cloud-based application determines that this storage limit is being approached, the cloud-based application can send an instruction to the cloud gateway 302 to reduce its upload frequency, thereby slowing the consumption of cloud storage resources. For systems comprising multiple cloud gateways, the cloud-based application can select which cloud gateways are to be adjusted based on respective criticalities of the control systems associated with the cloud gateways. For example, the cloud-based application can maintain individual cloud gateway profiles defining relative priorities of the industrial systems associated with each cloud gateway 302, and can leverage this information in connection with determining which cloud gateways are to be selected for reduced upload frequency in the event that one or more cloud resources are being used at an excessive rate.

In addition to periodic data upload, cloud gateway 302 may be configured to send some or all of its data to the cloud in response to detection of a defined event. To this end, a trigger condition can be defined for one or more data tags collected by the cloud gateway 302, such that the data contained in those tags will only be uploaded to the cloud platform in response to occurrence of the trigger condition. For example, it may be beneficial to collect data relating to a particular machine or process during an alarm event, so that a root cause of the alarm event can be determined based on analysis of the data. Accordingly, the alarm event of interest can be configured as the trigger event, and a selected subset of data tags accessible by the gateway can be associated with this trigger event. When the cloud gateway 302 detects occurrence of the alarm event (e.g., by detecting that a digital alarm tag has transitioned to an ON state), cloud gateway 302 can begin uploading data values for the selected subset of data tags to the cloud platform at a predefined frequency. When the alarm event (or other trigger event) is no longer true, cloud platform 302 may end transmission of the data tags to the cloud platform, or may continue to upload values of the data tags for a defined period of time after the alarm event has ended before ceasing transmission of the data.

In one or more embodiments, cloud gateway 302 can optionally include one or both of a transformation component 310 and an encryption component 314. The cloud gateway 302 can leverage these components to perform additional transformations on the industrial data prior to uploading to the cloud platform. For example, rather than sending the data directly to the cloud interface component 318 for delivery to the cloud platform, the device interface component 306 can first pass the industrial data as raw data 308 to transformation component 310. The transformation component 310 can be configured to transform the raw data 308 into transformed data 312 in accordance with one or more of a determined requirement of the cloud platform or the cloud application, a user-defined transform profile instructing how the data is to be transformed prior to being pushed to the cloud, or other transformation criteria. For example, the transformation component 310 can transform the raw data 308 to a format that consumes fewer cloud resources, thereby reducing costs and latency associated with such cloud-based applications. This can entail one or more of filtering, pruning, re-formatting, aggregating, summarizing, or compressing the raw data 308 to yield refined data 312. Additionally or alternatively, transformation component 310 can append contextual metadata to the raw data 308, thereby providing the cloud-based services with useful context information for the industrial data. Context metadata can include, but is not limited to, a time/date stamp, a quality value, a location associated with the data (e.g., a geographical location, a production area, etc.), machine statuses at the time the data was generated, or other such contextual information. In one or more embodiments, the transformation component 310 can modify the raw data 308 based on an explicit or inferred requirement of the cloud application, user-defined transform profiles instructing how various categories of raw data are to be transformed prior to being pushed to the cloud, and/or contextual metadata that provides context for the industrial data.

Cloud gateway 302 may also include an encryption component 314 configured to apply an encryption algorithm to either the raw data 308 or the transformed data 312 prior to uploading the data to the cloud platform as cloud data 320, thereby protecting the industrial data against viewing by unauthorized third-parties. Thus, the cloud data 320 may comprise the industrial data 304 in raw form, or data that has been transformed and/or encrypted by the transformation component 310 and/or encryption component 314, respectively.

Figure 5:
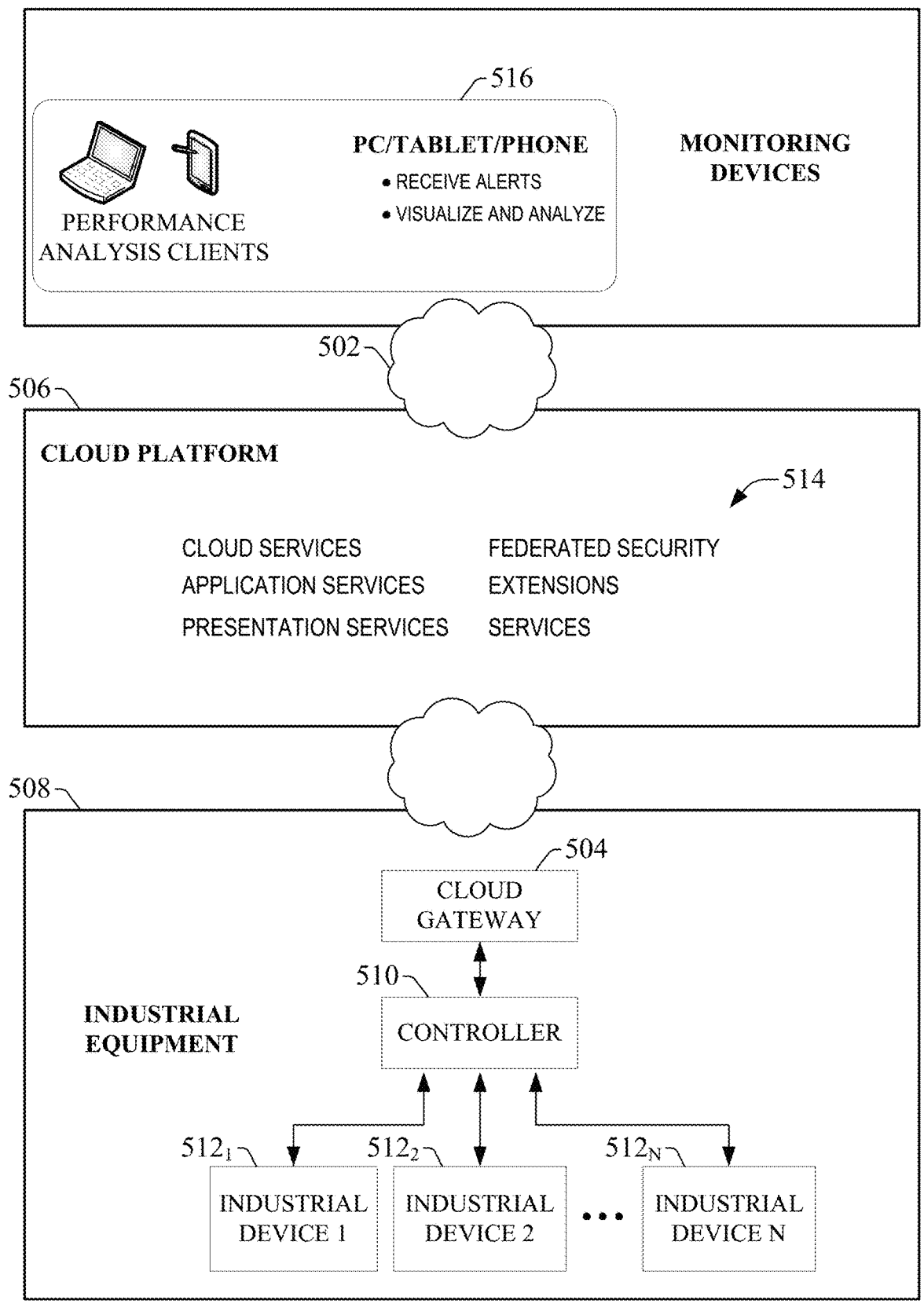
FIG. 5 is a high-level overview of a cloud gateway application used to periodically upload data from a controller to one or more cloud applications.

FIG. 5 illustrates a high level architecture of a cloud gateway application that can be used to upload data from a controller to a cloud application. The major layers are the generic Internet 502, the cloud platform 506, and the industrial equipment 508 comprising an industrial system. Industrial equipment 508 can be, for example, an industrial system comprising a number of industrial devices $512_1$-$512_N$ being monitored and/or controlled by an industrial controller 510. Industrial equipment 508 can also comprise higher level systems, such as on-premise data historians (including site-level historians or machine-level historians), supervisory control systems, batch systems, business intelligence systems, or other business-level or enterprise-level systems. Industrial equipment 508 can have a fixed location (e.g., an industrial facility), or can be a mobile system (e.g., a control and/or monitoring system loaded on a service or cargo vehicle). A cloud gateway 504 (similar to cloud gateway 302 of FIG. 3) can be used to periodically or continuously upload data from the controller 510 to one or more cloud applications on cloud platform 506, such as a cloud-based operator interface system, cloud-side storage, cloud-side processing services, or other cloud-based services.

In an exemplary scenario, cloud platform 506 can comprise a set of cloud resources provisioned to a provider of cloud services 514 as a platform-as-a-service (Paas), and the cloud services 514 can reside and execute on the cloud platform 506 as cloud-based services. Cloud applications can be built on the cloud platform 506 and made available to end users (e.g., as a subscription service). In one or more embodiments, the cloud platform 506 can be compatible with data models that are developed for enhanced manufacturing intelligence (EMI) software. Such applications can collect data from a customer's industrial system and correlate the data for the purpose of generating reports, creating custom visualizations, archiving the data, performing system analyses, or other functions. The cloud services 514 can support federated security, which provides secured access to the cloud services 514 from smart devices, such as phones and tablet computers.

The cloud services 514 can deliver visibility, reporting, analytics, and event management via client devices 516, which can interface with the cloud services 514 via the generic Internet layer 502. To cater for smart devices such as smart phones and tablet PCs, some cloud services 514 may not leverage flash-based dashboards, which often cannot be rendered on some mobile devices. Instead, some cloud services 514 may include dashboards built based on Hyper-Text Markup Language (HTML) and/or JavaScript technology. Internally, such dashboards may use a set of JSON (JavaScript Object Notation) based web services that are optimized for consumption by HTML/Javascript components.

The cloud gateway 504 can gather data from controller 510 or other industrial equipment, and push the data to the cloud applications on cloud platform 506. The cloud gateway 504 can be a stand-alone device, such as a computer running cloud gateway services and sharing a network with the controller 510. Alternatively, the cloud gateway 504 can be embedded in the controller 510 or other piece of industrial equipment as a gateway service. In some embodiments, the cloud gateway 504 may also be integrated within a network interface device, such as a hub, switch, router, or firewall box, residing on a common network with controller 510. The cloud gateway 504 can include a service responsible for pushing controller data from the controller 510 into cloud-based storage on cloud platform 506 via web services exposed by one or more cloud applications. One or more embodiments of the cloud gateway 504 can also support store-and-forward logic that causes controller data to be temporarily stored locally on the cloud gateway 504 in the event that communication between the gateway 504 and the cloud platform 506 is disrupted, as will be described in more detail below. Any suitable communication technology can be used to facilitate communication between the cloud gateway 504 and the cloud platform 506, including but not limited to wireless radio (e.g., 3G, 4G, etc.).

In addition to sending controller data to cloud-based applications on cloud platform 506, the cloud gateway 504 can also receive configuration instructions from the cloud-based applications. For example, a cloud-based application can send an instruction informing the cloud gateway 504 how frequently data should be uploaded to the cloud-based application (e.g., every minute, every 15 minutes, etc.). The cloud gateway 504 can also be configured locally using a stored configuration file (e.g., configuration file 402 of FIG. 4) that holds such information as a system identifier (e.g., identification of the industrial system monitored by the cloud gateway 504), a controller identifier of controller 510, a list of controller tags whose values are to be read by the gateway 504 and uploaded to the cloud-based application, a uniform resource locator (URL) of the cloud platform 506, a maximum amount of data to store locally at the cloud gateway 504 in the event of communication loss between the cloud gateway 504 and the cloud platform 506, or other such configuration information.

Figure 6:
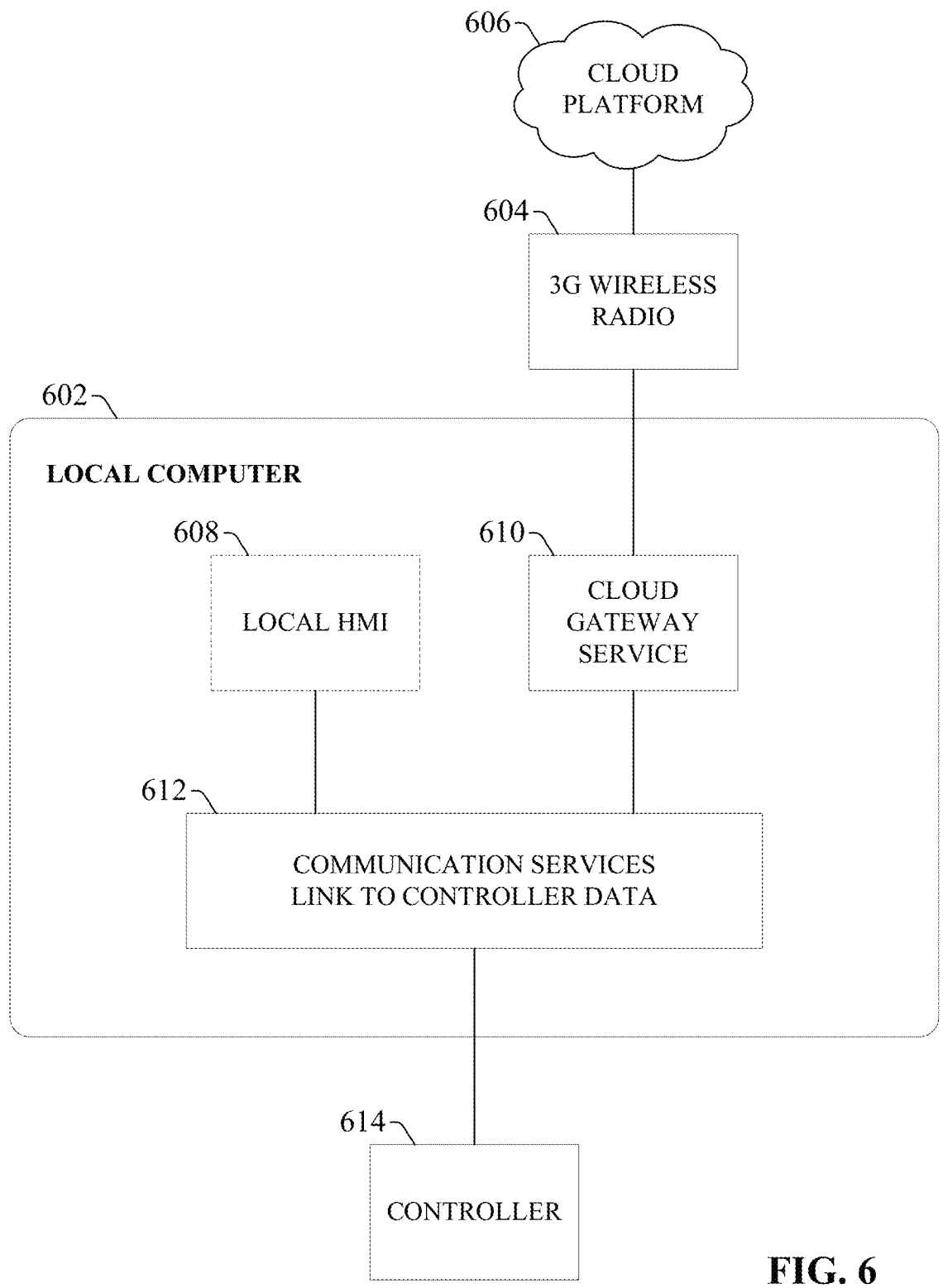
FIG. 6 is a block diagram of an exemplary cloud gateway configuration for sending data from a mobile control and/or monitoring system to a cloud platform.

As noted above, in addition to being used to collect data from fixed-location industrial systems, the cloud gateway described herein can be used to collect industrial data from mobile industrial systems, such as control and/or monitoring systems embedded in a truck or other service vehicle. FIG. 6 illustrates an exemplary cloud gateway configuration that can be used to send data from such mobile systems to a cloud platform. In the present example, it will be assumed that data is to be collected from a machine health monitoring system running on board a truck. However, it is to be understood that the systems and methods described are applicable for collecting data from any mobile control and/or monitoring system and sending the data to a cloud-platform.

Customer Equipment (e.g., industrial equipment 508 of FIG. 5) loaded on a truck can have associated therewith a local computer 602 running a cloud gateway service 610. Local computer 602 may be a ruggedized computer having a reinforced casing designed to withstand the vibration and turbulence that can be experienced during travel on-board the truck. Cloud gateway service 610 can perform similar functions to those of the cloud gateway 202, 302, and 504 of FIGS. 2, 3, and 5. Communication services 612, also running on local computer 602, can facilitate communication with controller 614, which is used to monitor and/or control the on-hoard machine health system. The local computer 602 can also optionally include a local human-machine interface (HMI) 608 for local visualization of controller data at the truck.

In one or more embodiments, the cloud gateway service 610 can be a service (e.g., a Windows service) that runs on local computer 602 on-board the truck. The cloud gateway service 610 is responsible for pushing local controller data from controller 614 to cloud platform 606 via the web services exposed by a cloud application. The cloud gateway service 610 can also support store-and-forward logic used when the connection between the truck and the cloud platform 606 is temporarily interrupted. In some embodiments, the data collected by the cloud gateway service 610 can be pushed to the cloud via a wireless radio 604 on-board the truck (e.g., 3G wireless radio).

In one or more embodiments, the cloud gateway service 610 can periodically read data from the controller 614 and a global positioning system (GPS) location provider (not shown) on-board the truck and send both the controller data and the GPS data to the cloud application residing on cloud platform 606. The cloud gateway service 610 can also receive information from a cloud application residing on cloud platform 606 to dynamically adjust the communication parameters, such as data collection and upload frequency, store-and-forward parameters, etc.

The upload frequency (e.g., slow poll mode versus fast poll mode) can be controlled by the cloud application executing on the cloud platform 606 on a per truck basis. For example, an object representing a given truck in the cloud application may have a property indicating the communication parameters for the given truck's cloud gateway. The cloud gateway service 610 can ping the cloud platform 606 at a pre-defined frequency (e.g., once per minute) to upload the controller data and/or to check for a change in the upload mode (fast poll mode versus slow poll mode). Similar to examples described above in connection with FIGS. 3 and 4, the cloud gateway service 610 can be configured locally using a configuration file having fields for the Truck ID, Controller ID, the controller tags whose values are to be read from the controller 614 and uploaded to the cloud platform 606, the URL of the cloud platform or cloud application to which the data is to be sent, and a maximum amount of data to store locally in case of a faulty network connection (in connection with store-and-forward logic).

Figure 7:
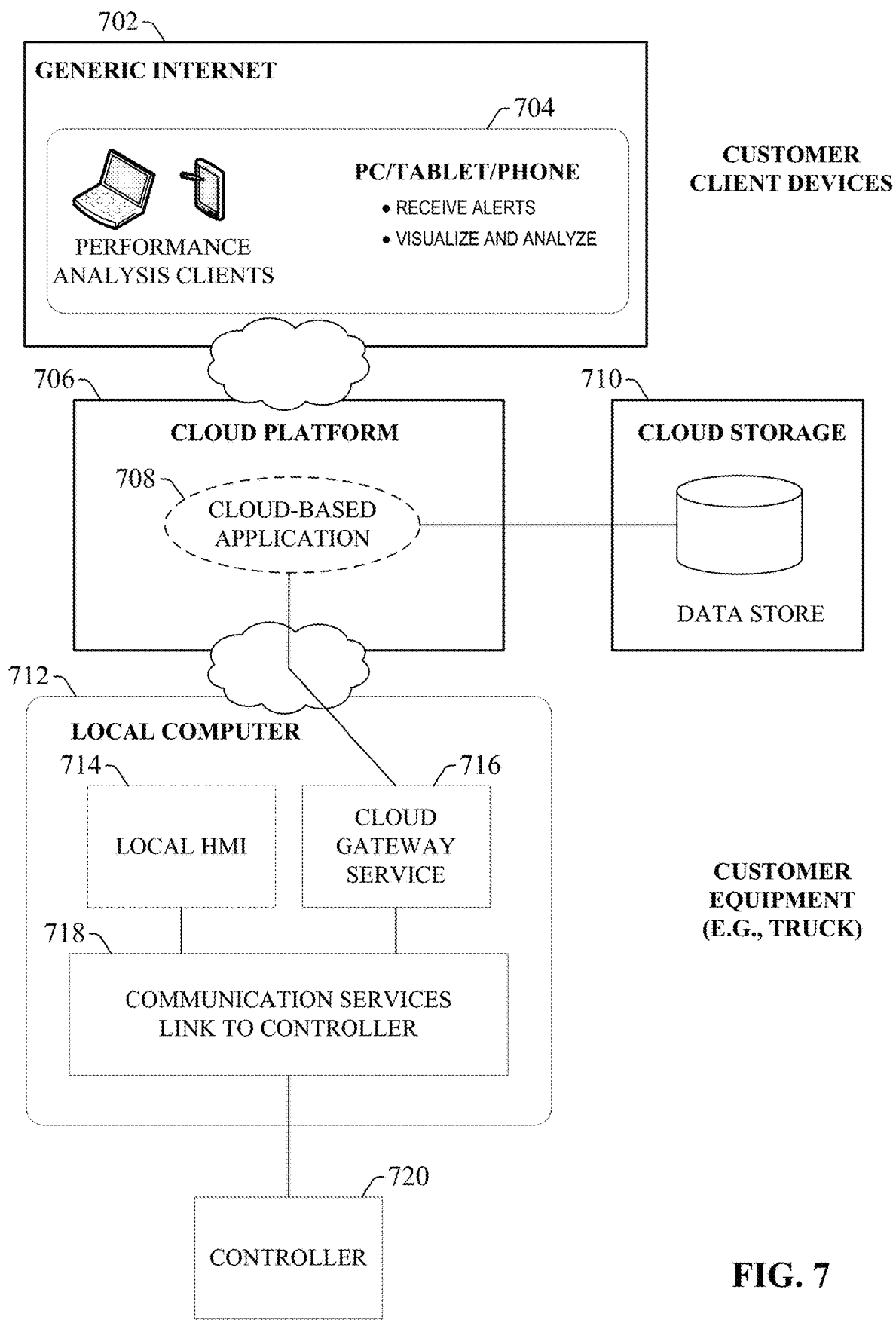
FIG. 7 is an exemplary high-level architecture in which a mobilized cloud gateway service renders system data from a mobile control and/or monitoring system available to client devices via a cloud platform.

FIG. 7 illustrates an exemplary high-level architecture in which the mobilized cloud gateway service described above in connection with FIG. 6 is used to make system data from a mobile control and/or monitoring system available to client devices via a cloud platform. Similar to the cloud gateway computer of FIG. 6, local computer 712 (e.g., a ruggedized computer) executes communication services 718 to exchange data with controller 720 associated with a control and/or monitoring system on-board a truck or other service vehicle. Local computer 712 can also execute cloud gateway service 716 which pushes local controller data from controller 720 to cloud platform 706 via web services exposed by a cloud application 708 running on the cloud platform 706. Although not shown, some embodiments of the cloud gateway service 716 may push the controller data to the cloud platform via a wireless radio (e.g., 3G, 4G, etc.) on-board the truck (e.g., radio 604 of FIG. 6). Local computer 712 may optionally include a local HMI 714 for local monitoring of the controller data.

Cloud-based application 708 running on the cloud platform 706 can receive the controller data 720 sent by the cloud gateway service 716, and utilize the data according to the functionality of the particular application. For example, cloud-based application 708 may be a cloud-based operator interface application (e.g., a cloud-based HMI system) that serves operator interface screens to authorized client devices 704 over a generic internet layer 702, and renders selected subsets of the controller data on the operator interface screens. Thus, the cloud gateway service 716 facilitates remote monitoring of the mobile control/monitoring system on-board the truck by publishing the controller data to the cloud-based application 708, where the data can be retrieved by client devices 704 over the Internet. In another exemplary scenario, cloud-based application 708 may be a cloud-based notification system that monitors the controller data provided by cloud gateway service 716, and issues notifications to pre-designated client devices 704 in response to detection of a pre-defined notification trigger condition (e.g., a particular system value exceeding a setpoint, an alarm condition, etc.). Cloud-based application 708 may also store some or all of the controller data provided by the cloud gateway service 716 on cloud storage 710 for archival purposes. It is to be appreciated that cloud-based application 708 is not limited to the exemplary types of applications described herein, but rather can be any suitable application that receives industrial data from a stationary or mobile system and provides information to remote client devices as a function of this industrial data.

One or more embodiments of cloud gateway services 716 can also support remote auto-updating, wherein updates to the gateway services 716 can be received from the cloud platform and automatically implemented. In such embodiments, updates to the services (e.g., bug fixes) can be broadcast to multiple gateways from the cloud platform and implemented substantially invisibly to the end user.

Figure 8:
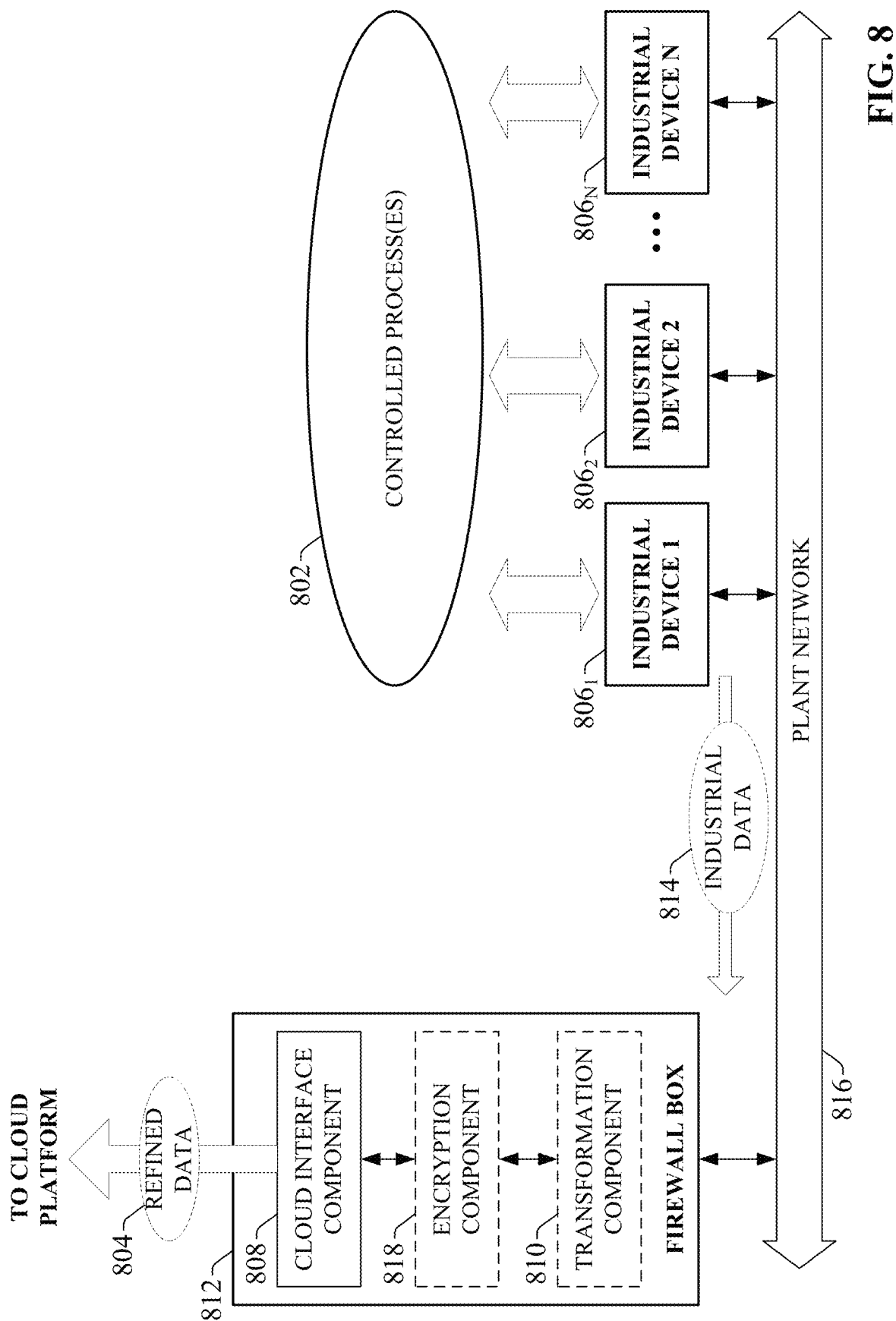
FIG. 8 illustrates a system configuration in which a firewall box serves as a cloud gateway for a set of industrial devices.

While previous examples have described the cloud gateway as a stand-alone device or a service running on a conventional computer (e.g., the mobilized computer of FIGS. 6 and 7), cloud gateway functionality can be embodied in other types of devices according to one or more embodiments of this disclosure. For example, FIG. 8 illustrates an embodiment in which a firewall box 812 serves as a cloud gateway for a set of industrial devices $806_1$-$806_N$. Firewall box 812 can act as a network infrastructure device that allows plant network 816 to access an outside network such as the Internet, while also providing firewall protection that prevents unauthorized access to the plant network 812 from the Internet. That is, firewall box 812 can manage transfer of data packets between the plant network 816 and the Internet to facilitate secure access to outside networks by devices on the plant network 816. In addition to these firewall functions, the firewall box 812 can include a cloud interface component 808 (similar to cloud interface components 204 and 318 of FIGS. 2 and 3, respectively) that interfaces the firewall box 812 with one or more cloud-based applications on a cloud platform. In this exemplary embodiment, the firewall box 812 can collect industrial data 814 from industrial devices $806_1$-$806_N$, which monitor and control respective portions of controlled process(es) 802. Firewall box 812 can also optionally include a transformation component 810 (similar to transformation components 208 and 310 of FIGS. 2 and 3, respectively), which applies suitable transformations to the gathered industrial data 814 prior to pushing the data to the cloud platform as refined data 804. As described in previous examples, these transformations can include, but are not limited to, compression, truncation, summarization, filtering, aggregation, addition of contextual metadata, or other such transformations in accordance with user-defined or cloud-defined requirements. Firewall box 812 may also optionally include an encryption component 818 (similar to encryption components 210 and 314 of FIGS. 2 and 3, respectively) configured to encrypt the industrial data 814 using any suitable encryption method. Thus, the firewall box 812 depicted in FIG. 8 can allow industrial devices $806_1$-$806_N$ to interact with the cloud platform without directly exposing the industrial devices to the Internet.

In one or more embodiments, the cloud interface component 808 can also receive data from the cloud platform, and route this data to one or more of the industrial devices $806_1$-$806_N$. For example, a cloud-based service may be an enterprise resource management (ERP) system that analyzes production data in view of one or more defined business goals, and generates production schedule information based on the analysis. Accordingly, firewall box 812 can receive the required production data from industrial devices $806_1$-$806_N$ as industrial data 814, optionally transform and/or encrypt the production data using transformation component 810 and/or encryption component 818, and provide the production data to the cloud-based ERP system as refined data 804. In response, the cloud-based ERP system can analyze the production data and generate updated production schedule information designed to ensure that one or more defined business goals are met (e.g., fulfill a given customer order, maintain total plant energy usage below a defined peak demand, etc.). The cloud-based ERP system can provide this scheduling information to the firewall box 812 (via cloud interface component 808), which can then route the scheduling information to the appropriate industrial devices $806_1$-$806_N$.

Figure 9:
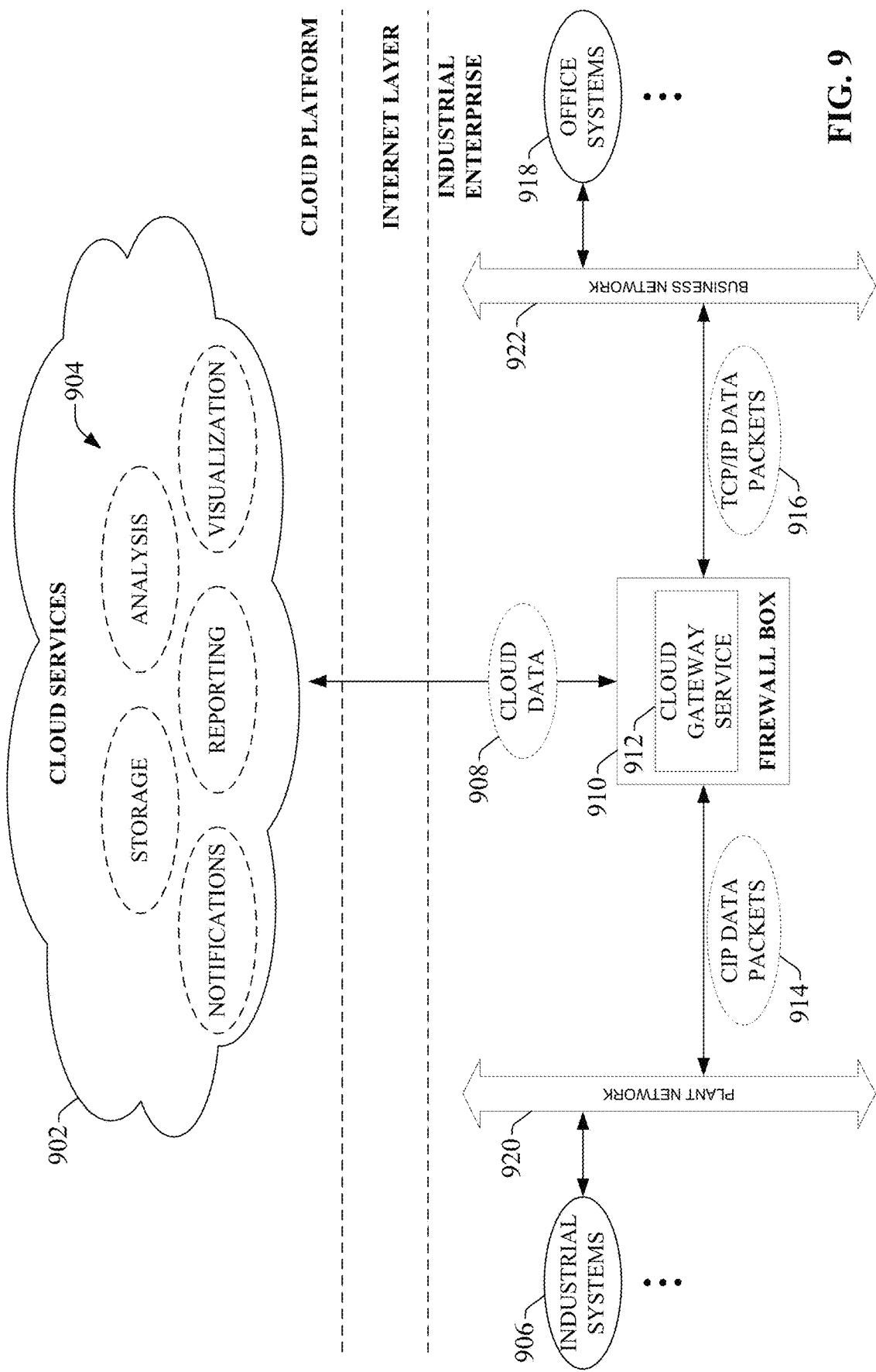
FIG. 9 illustrates an exemplary network architecture that includes a firewall box having cloud gateway functionality.

FIG. 9 illustrates an exemplary network architecture that includes a firewall box having cloud gateway functionality. In this example, an industrial enterprise includes both a plant network 920 and business network 922. Plant network 920 communicatively connects one or more industrial systems 906 (e.g., automation systems, batch processing systems, vision systems, lot traceability systems, etc.) on the plant floor. Plant network 920 can facilitate communication between the industrial systems using any suitable network technology or protocol, including, but not limited to, Ethernet, Ethernet/IP, DeviceNet, ControlNet, Data Highway and Data Highway Plus (DH/DH+), Remote I/O, Fieldbus, Modbus, Profibus, wireless networks, or serial protocols. On the business level of the enterprise, business network 922 interconnects one or more office systems 918 using a suitable office network protocol (e.g., TCP/IP over Ethernet). For example, business network 922 can be an office network that interconnects employee desktop or laptop computers to an office server, printing devices, or other office equipment.

In the present example, both the plant network 920 and the business network 922 can access the Internet through firewall box 910, which manages access to outside networks while protecting both the plant network 920 and business network 922 from unauthorized access from outside entities. The firewall box 910 can also route data packets between the plant network 920 and the business network 922 (e.g., CIP data packets 914 from the plant network 920 and TCP/IP data packets 916 from the business network 922). In addition to these routing and firewall protection capabilities, firewall box 910 can include a cloud gateway service 912 that performs functionality similar to the cloud gateways and gateway services described above (e.g., cloud gateways 202, 302, and 504, and cloud gateway services 610 and 716). For example, the cloud gateway service 912 running on firewall box 910 can retrieve selected industrial data from industrial systems 906 over plant network 920, and send the industrial data as cloud data 908 to cloud platform 902, as described in previous examples, thereby allowing the data to be utilized by one or more cloud services 904 running on the cloud platform 902 (similar to cloud services 112 of FIG. 1, or cloud-based application 708 of FIG. 7). Similar to the embodiments described in connection with FIGS. 3 and 4, the cloud gateway service 912 on firewall box 910 can perform encryption and/or transformation functionality on the industrial data prior to sending the data to the cloud platform 902. The cloud gateway service 912 can be configured using a configuration file stored on the firewall box 910, similar to configuration file 402 of FIG. 4.

Once the industrial data is provided to the cloud platform 902, the data (or data generated by the cloud services 904 as a function of the industrial data) can be accessed by authorized Internet-capable client devices (e.g., client devices 516 or 704 of FIGS. 5 and 7, respectively). The data on cloud platform 902 can also be accessed by authorized devices on the business network 922 (e.g., desktop, laptop, or tablet computers; mobile phones connected to the business network over a local wireless connection, etc.). Moreover, as with the firewall box 812 of FIG. 8, some embodiments of the cloud gateway service 912 can receive data from the cloud services 904 (e.g., a cloud-based ERP application, a cloud-based HMI application, etc.) and provision the received data to the appropriate industrial systems 906. For example, a cloud-based ERP or HMI service may attempt to write a new setpoint value to a selected controller of one of the industrial systems 906. The cloud gateway service 912 can receive this new setpoint value and write the new value to the appropriate data tag in the selected controller over plant network 920.

Figure 10:
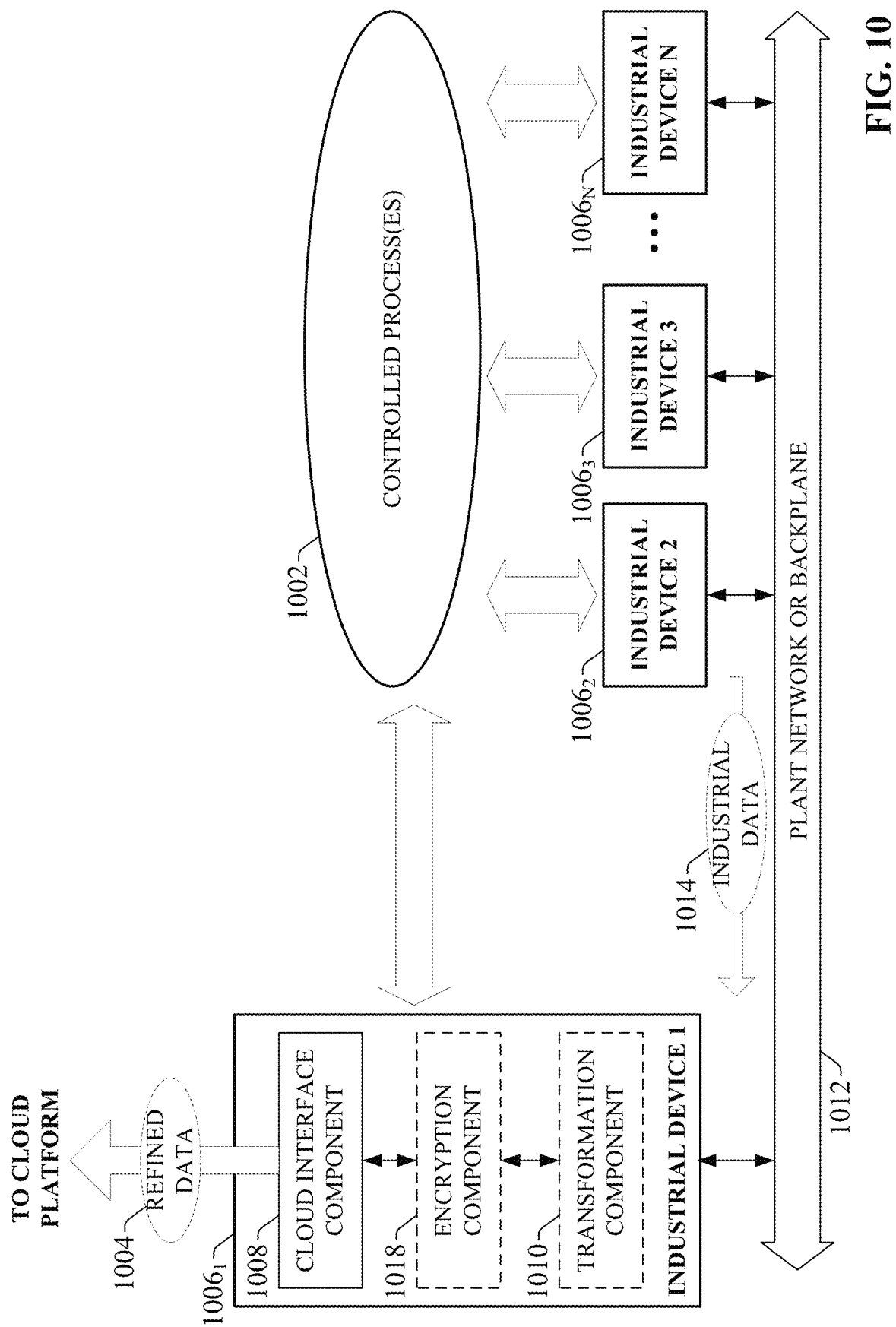
FIG. 10 illustrates a configuration in which an industrial device acts as a cloud gateway for other industrial devices comprising an automation system.

While the cloud gateway functions described in connection with FIGS. 8 and 9 are depicted as running on a firewall box, other types of devices can also be configured to serve as a cloud gateways according to one or more embodiments of this disclosure. FIG. 10 depicts an exemplary configuration in which an industrial device acts as a cloud gateway for other industrial devices comprising an automation system. In this example, an automation system comprises a plurality of industrial devices $1006_1$-$1006_N$ which collectively monitor and/or control one or more controlled processes 1002. The industrial devices $1006_1$-$1006_N$ respectively generate and/or collect process data relating to control of the controlled process(es) 1002. For industrial controllers such as PLCs or other automation controllers, this can include collecting data from telemetry devices connected to the controllers' I/O, generating data internally based on measured process values, etc.

In the configuration depicted in FIG. 10, industrial device $1006_1$ acts as a cloud gateway for industrial devices $1006_2$-$1006_N$, such that industrial data 1014 from devices $1006_2$-$1006_N$ is sent to the cloud platform via industrial device $1006_1$, which serves as a cloud proxy device for the other industrial devices. Industrial devices $1006_2$-$1006_N$ can deliver their industrial data 1014 to proxy industrial device $1006_1$ over plant network or backplane 1012 (e.g., a CIP network or other suitable network protocol). Using this configuration, it is only necessary to interface one industrial device to the cloud platform (via cloud interface component 1008). Proxy industrial device $1006_1$ can optionally include a transformation component 1010 (similar to transformation components 208, 310, and 810 of FIGS. 2, 3, and 8, respectively) for applying suitable transformations to the collective industrial data 1014 collected from industrial devices $1006_2$-$1006_N$, as well as to its own control data. The proxy industrial device can also optionally include an encryption component 1018 (similar to encryption components 210, 314, and 818 of FIGS. 2, 3, and 8, respectively) for encrypting the industrial data 1014 prior to submission to the cloud platform. The transformed and/or encrypted data can then be pushed to the cloud as refined data 1004 via cloud interface component 1008.

Since data is being gathered from multiple industrial devices according to this configuration, there is a possibility that redundant data may be provided to industrial device $1006_1$ from more than one source. Accordingly, transformation component 1010 may be configured to filter such redundant data prior to delivering the refined data to the cloud-based application. Transformation component 1010 may also be configured to summarize the gathered data according to defined summarization criteria prior to delivery to the cloud platform.

Figure 11:
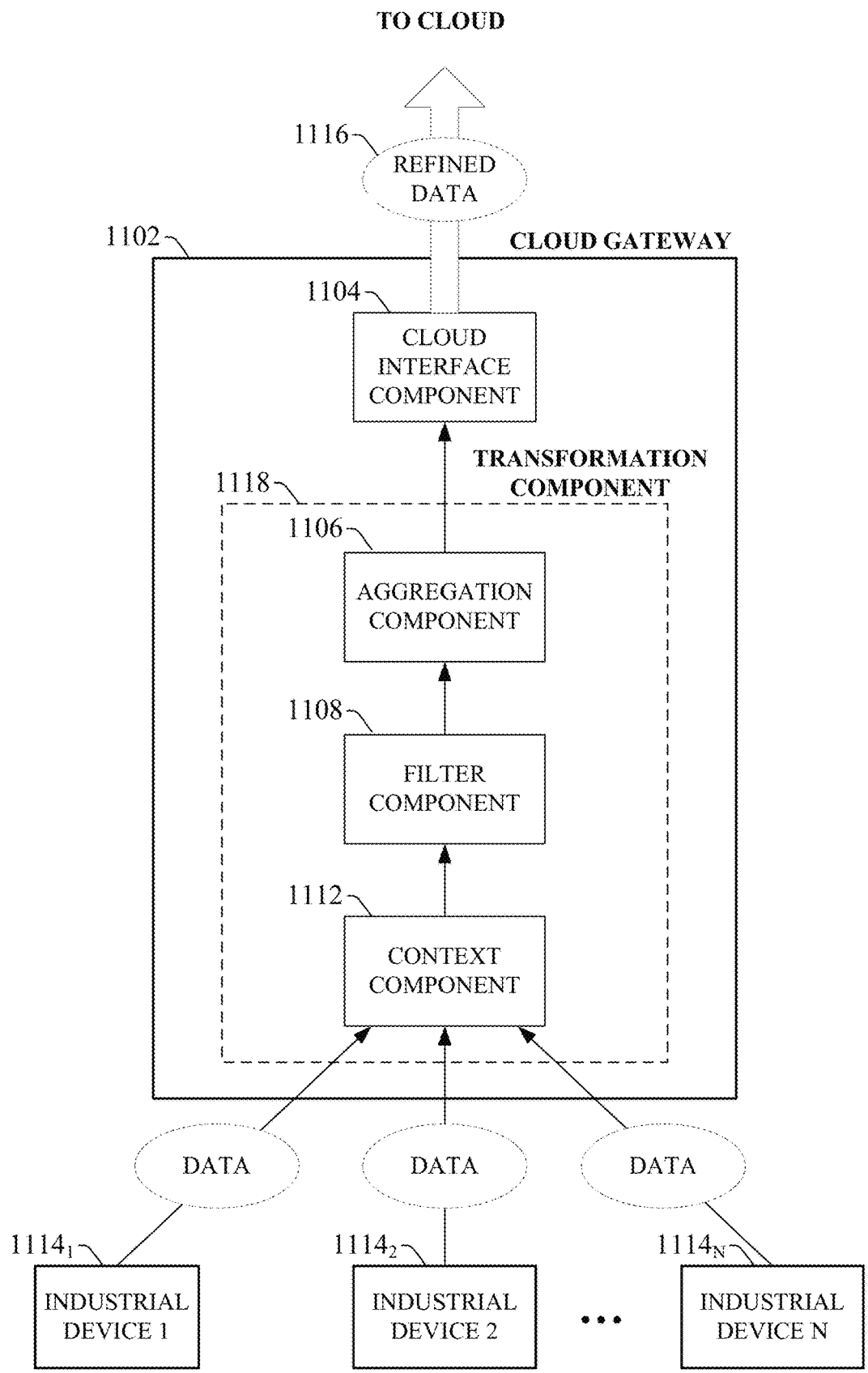
FIG. 11 illustrates an exemplary cloud gateway configured to transform industrial data prior to delivery to a cloud platform.

As noted above, one or more embodiments of the cloud gateway described herein can transform or contextualize received industrial data prior to sending the data to the cloud platform. FIG. 11 illustrates a cloud gateway having such transformation capabilities according to an exemplary application. Cloud gateway 1102 can be any suitable device (such as a stand-alone computer or gateway device, a proxy industrial device similar to device $1006_1$ of FIG. 10, or a firewall box similar to firewall boxes 812 or 910 of FIGS. 8 and 9) that gathers production data from one or more industrial devices $1114_1$-$1114_N$ and delivers this data to a cloud-based application or service. Cloud gateway 1102 includes a transformation component 1118 configured to transform the production data according to a user-defined or cloud-defined requirement. In the present example, the cloud gateway 1102 is configured to refine the data received from industrial devices $1114_1$-$1114_N$ by appending the data with contextual metadata, apply filtering to remove data not needed by the cloud-based application, and aggregate the remaining data according to defined aggregation criteria. To this end, transformation component 1118 leverages a context component 1112, a filter component 1108, and an aggregation component 1106 to transform the collected raw data to refined data 1116.

Figure 12:
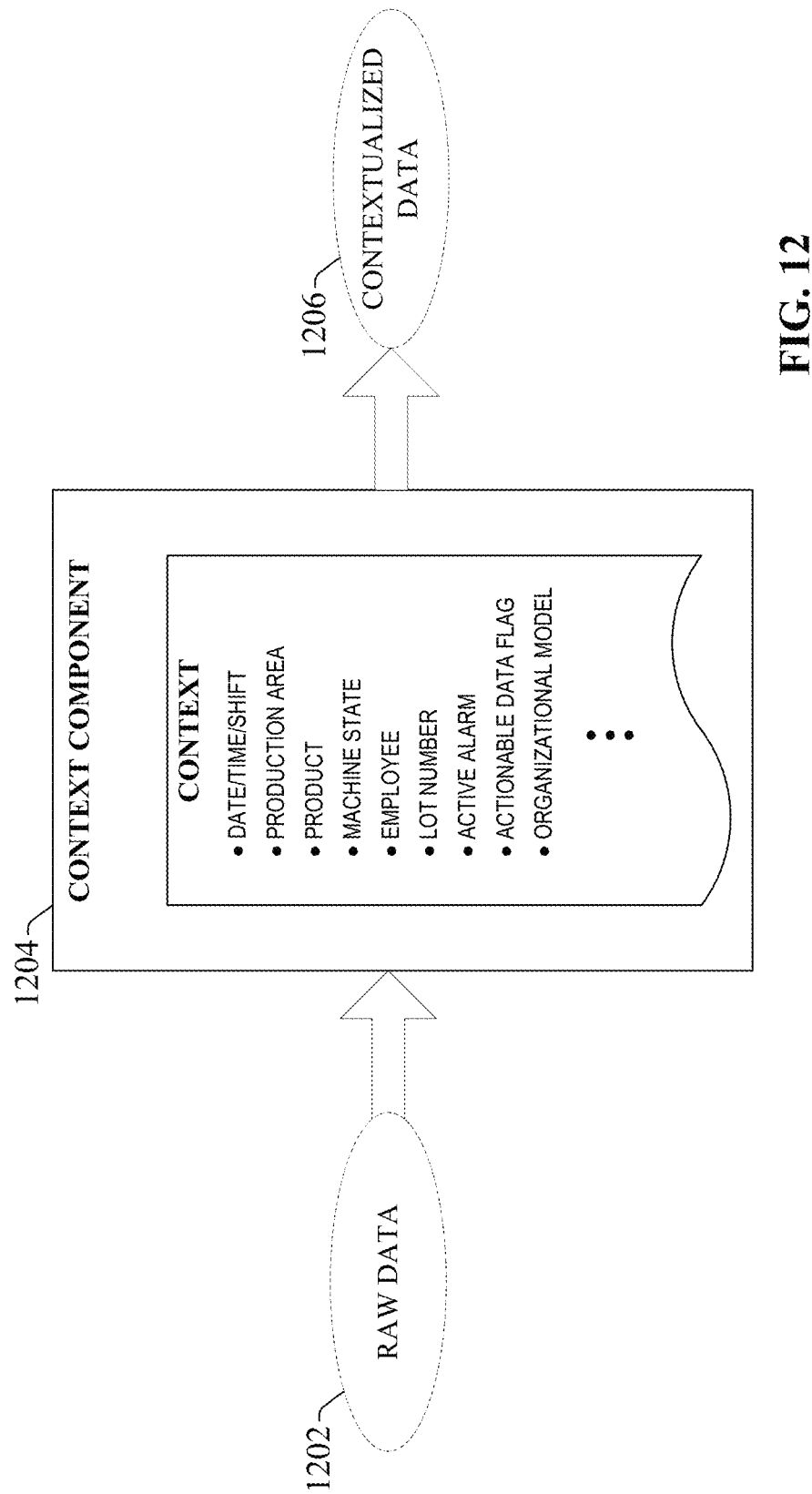
FIG. 12 illustrates an exemplary context component for transforming raw industrial data into contextualized data.

The context component 1112 can append contextual information or metadata to the raw production data. The contextual information provides context for the data, which can be leveraged by subsequent transformation steps or used by the cloud-based application in connection with cloud-side analysis. Turning briefly to FIG. 12, an exemplary context component for transforming raw data into contextualized data is illustrated. Context component 1204 receives raw production data 1202 and enhances the raw data 1202 with one or more pieces of context data to yield contextualized data 1206. For example, context component 1204 can apply a time stamp to the raw data 1202 indicating a time, a date, and/or a production shift when the data was generated. The applied context data may also include a production area that yielded the data, a particular product that was being produced when the data was generated, and/or a state of a machine (e.g., auto, semi-auto, abnormal, etc.) at the time the data was generated. Other examples of context information include an employee on shift at the time the data was generated, a lot number with which the data is associated, or an alarm that was active at the time the data was generated. Context component 1204 can also apply an actionable data tag to the raw data if it is determined that the data requires action to be taken by plant personnel or by the cloud-based application.

Context component 1204 an also apply contextual information to the raw data 1202 that reflects the data's location within a hierarchical organizational model. Such an organizational model can represent an industrial enterprise in terms of multiple hierarchical levels. In an exemplary organizational model, the hierarchical levels can include—from lowest to highest—a workcell level, a line level, an area level, a site level, and an enterprise level. Devices that are components of a given automation system can be described and identified in terms of these hierarchical levels, allowing a common terminology to be used across the entire enterprise to identify devices, machines, and data within the enterprise. In some embodiments, the organizational model can be known to the context component 1204, which can stamp the raw data 1202 with a hierarchical identification tag that indicates the data's origin within the organizational hierarchy (e.g., Company:Marysville:DieCastArea:#1Headline:LeakTestCell).

Returning to FIG. 11, after the context component 1112 has added contextual information to the raw data, filter component 1108 can determine which of the contextualized data is to be pushed to the cloud, and discard data that is not required by the cloud-based service. Filter component 1108 can filter the contextualized data according to any specified filtering criterion. In some embodiments, filtering criteria can be defined in a transform profile associated with the transformation component 1118. Exemplary filtering criteria can include instructions to discard certain types of data if the data exceeds (or falls below) a defined setpoint. For example, the filtering criteria can specify that weight data collected from a testing device of a particular workcell is to be discarded if the data exceeds a maximum weight value indicative of a faulty reading. In such scenarios, the data to which this filter criterion is to be applied can be identified based on the contextual information applied to the data by the context component 1112. Filter component 1108 can also be configured to identify redundant data collected from two or more of the industrial devices $1114_1$-$1114_N$, and discard redundant instances of the same data. Again, filter component 1108 can leverage the contextual information applied by the context component 1112 to identify instances of redundant data.

Transformation component 1118 can also include an aggregation component 1106 configured to combine related data according to one or more predefined aggregation instructions. For example, once the data from industrial devices $1114_1$-$1114_N$ has been contextualized and filtered by the context component 1112 and the filter component 1108, aggregation component 1106 can identify related data, which may originate from multiple data sources, and combine the related data into a common upload for delivery to a cloud-based service or application. The resulting refined data 1116 can be pushed to the cloud platform via cloud interface component 1104.

While the exemplary transformation component 1118 of FIG. 11 is described as including a context component 1112, a filter component 1108, and an aggregation component 1106, it is to be appreciated that the transformation component 1118 integrated with cloud gateway 1102 can include any suitable combination of data refinement functions, according to the needs of the user and the requirements of the particular cloud-based services being used. For example, transformation component 1118 may compress, encrypt, and/or reformat the collected raw data prior to pushing the data to the cloud-based service.

Figure 13:
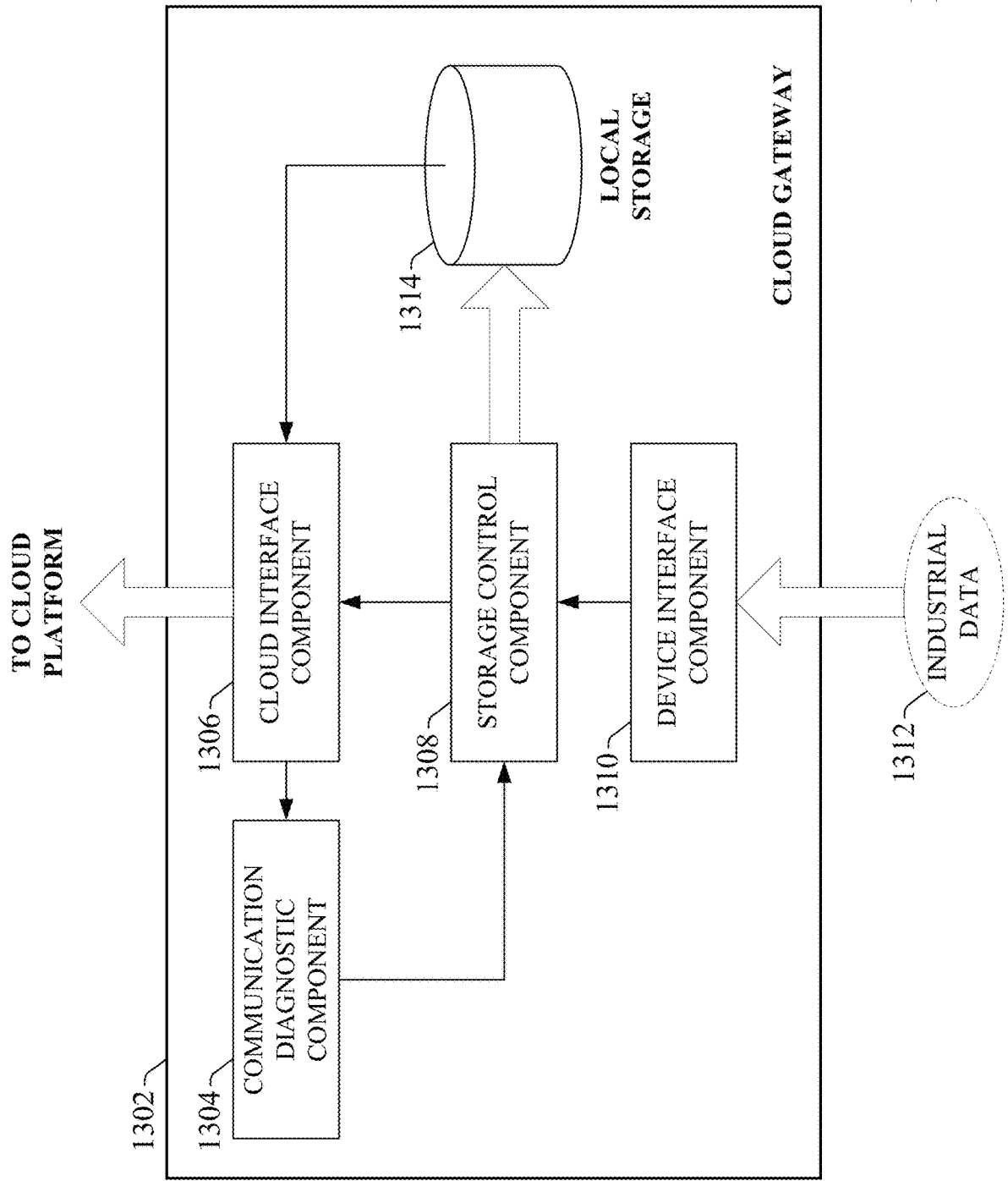
FIG. 13 is a block diagram of an exemplary cloud gateway that supports store-and-forward capability.

FIG. 13 illustrates an exemplary cloud gateway that supports store-and-forward capability according to one or more embodiments. Cloud gateway 1302 includes a device interface component 1310 (similar to device interface components 206 and 306 of FIGS. 2 and 3, respectively) configured to communicatively couple the cloud gateway 1302 to one or more devices of a user's industrial system (e.g., an industrial controller, meter, sensor, etc.) and exchange data therewith. For example, the device interface component 1310 can receive industrial data 1312 from one or more industrial devices to be sent to the cloud platform (e.g., in accordance with a configuration file associated with the cloud gateway 1302). Cloud gateway 1302 also includes a cloud interface component 1306 (similar to cloud interface components 204 and 318 of FIGS. 2 and 3, respectively) configured to couple the cloud gateway 1302 to a web-based or private cloud platform and exchange data therewith. Using these components, the cloud gateway can collect industrial data from one or more devices comprising a user's industrial system, and send the data to a cloud platform to be leveraged by one or more cloud-based services.

In addition, cloud gateway 1302 also includes a storage control component 1308 and a communication diagnostic component 1304 that allow the cloud gateway 1302 to support store-and-forward functionality. Store-and-forward functionality allows the cloud gateway 1302 to temporarily store received industrial data 1312 on local storage 1314 in the event that communication between the cloud interface component 1306 and the cloud platform is lost. When the communication link is reinstated, the data that had been stored in local storage 1314 during the communication outage can be sent to the cloud platform, ensuring that the cloud-based services and applications experience no data gaps despite the communication outage.

To this end, the communication diagnostic component 1304 can monitor communication health of the cloud interface component 1306 and determine when communication between the cloud gateway 1302 and the cloud platform has been disrupted. The storage control component 1308 controls whether industrial data 1312 received at the device interface component 1310 is sent to the cloud interface component 1306 for transmission to the cloud platform, or alternatively if the industrial data is to be sent to local storage 1314. While the communication link to the cloud platform is operational, the storage control component 1308 routes the data 1312 directly to the cloud interface component 1306. When the communication diagnostic component 1304 detects a communication disruption, it can instruct storage control component 1308 to begin writing the incoming industrial data 1312 to local storage 1314, where the data can be stored temporarily until the communication link is reinstated.

The maximum amount of local storage 1314 designated for storage of industrial data 1312 can be configured using the "maximum local storage" field of the gateway configuration file (e.g., gateway configuration file 402 of FIG. 4). For example, if the maximum local storage value is set to 500 Mb, the storage control component 1308 will continue to write new incoming industrial data 1312 to local storage 1314 until this maximum amount of storage space is reached. If the communication link has not been reestablished by this time, and industrial data 1312 continues to be received, the storage control component 1308 can begin erasing the oldest data in the local storage 1314 and replacing the erased data with the newly received data, ensuring that the defined maximum amount of local storage is not exceeded. When communication to the cloud platform resumes, the storage control component 1308 can retrieve the data written to local storage 1314 and send this data to the cloud platform. The storage control component 1308 will subsequently revert to sending incoming industrial data 1312 to the cloud interface component 1306 for transmission to the cloud platform. Configuration parameters can control how to perform the forwarding of previously stored data. Options include: Send data in chunks with oldest data first (First In First Out, or FIFO), or newest data first (First In Last Out, or FILO). Furthermore, the regular uploading of current values might occur in parallel to the forwarding activity to make sure that the most recent data is always available.

Figure 14:
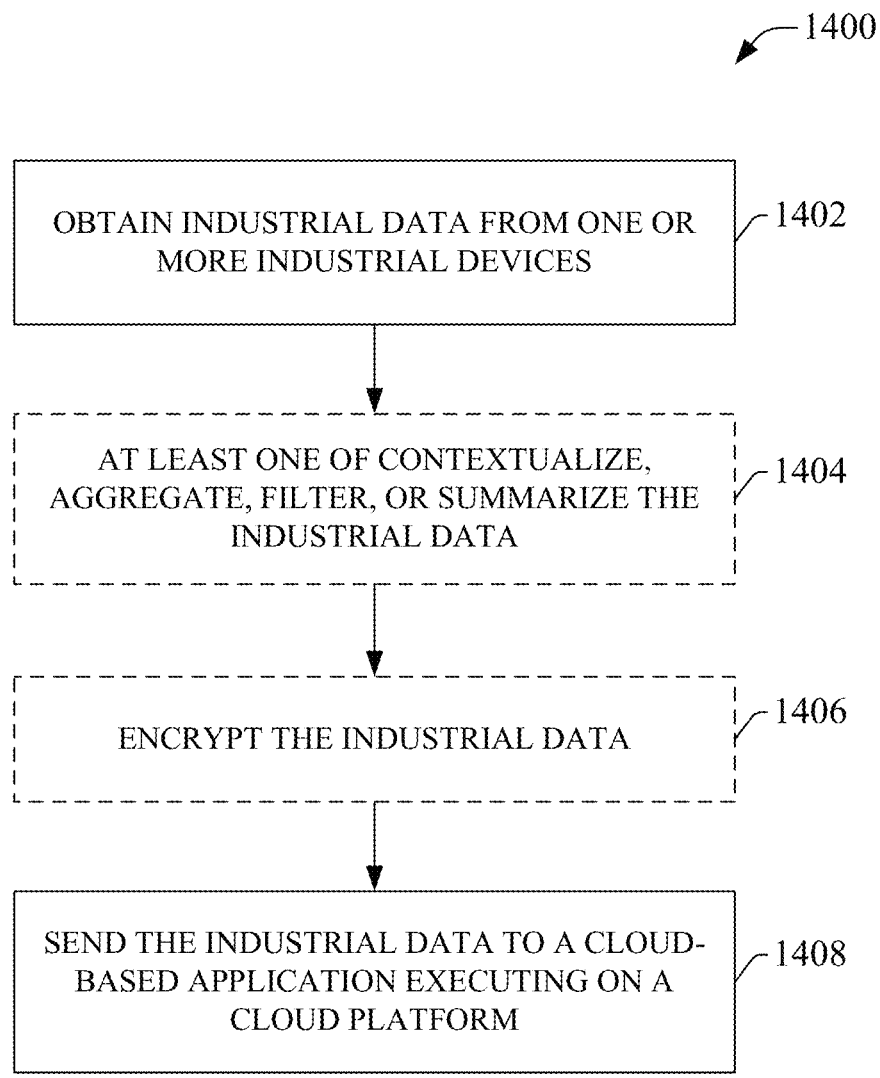
FIG. 14 is a flowchart of an example methodology for sending industrial data to a cloud platform.
Figure 15:
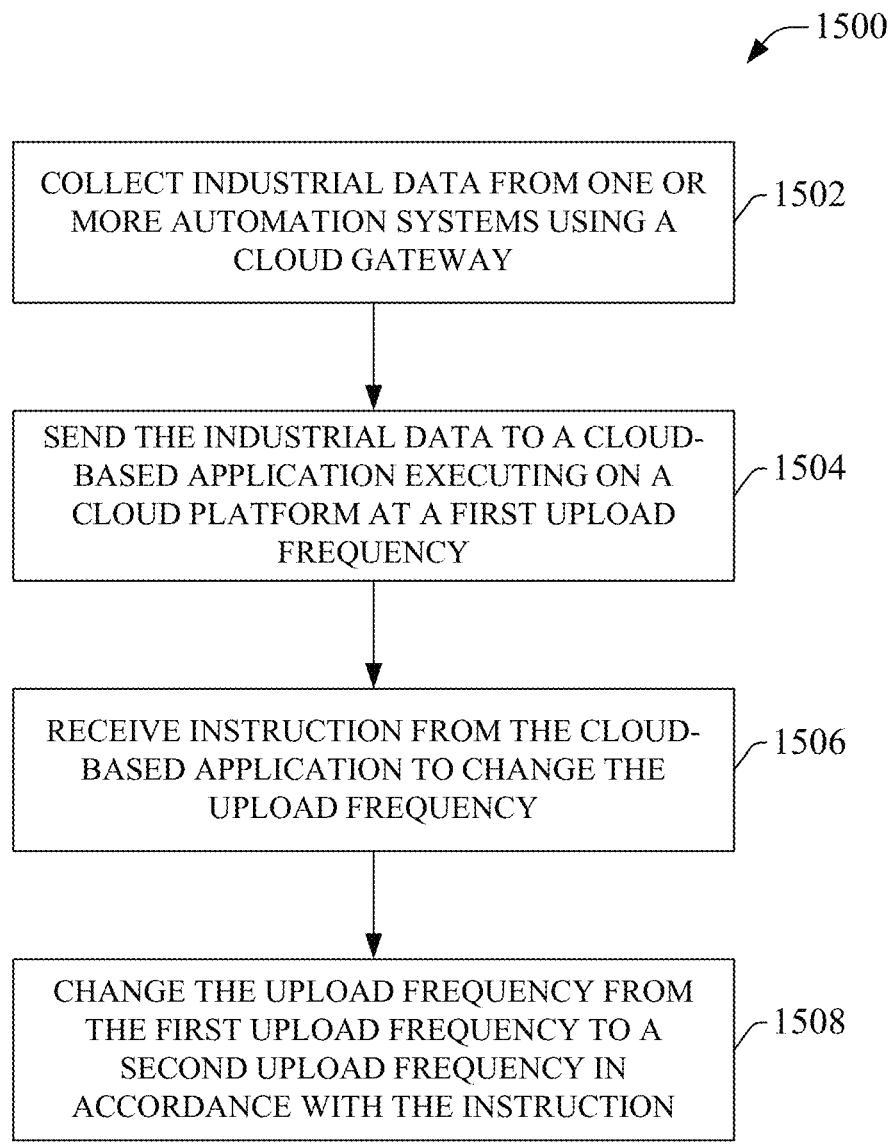
FIG. 15 is a flowchart of an example methodology for dynamically controlling an upload frequency of a cloud gateway.
Figure 16:
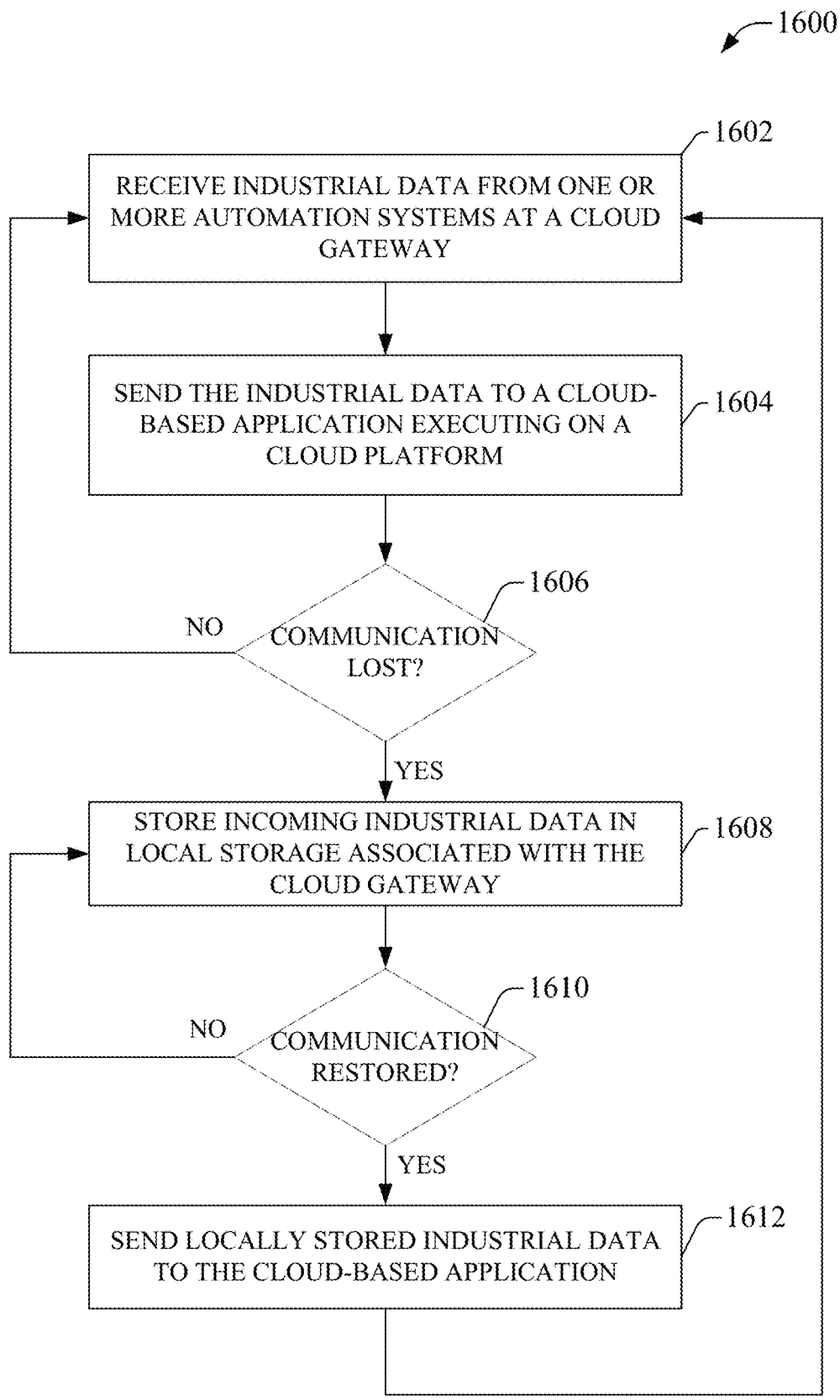
FIG. 16 is a flowchart of an example methodology for implementing store-and-forward functionality in a cloud gateway.

FIGS. 14-16 illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 14 illustrates an example methodology 1400 for sending industrial data to a cloud platform. Initially, at 1402, industrial data is obtained (e.g., by a device interface component 206) from one or more industrial devices. The industrial data can be retrieved, for example from one or more controller tags or data registers in an industrial controller. The industrial data may also be retrieved from one or more meters or other telemetry devices (e.g., flow meters, temperature meters, level sensors, etc.). The industrial data can be obtained, for example, by a cloud gateway device in accordance with a configuration file associated with the gateway device, where the configuration file identifies one or more items of industrial data to be retrieved.

Optionally, at 1404, the industrial data is at least one of contextualized, aggregated, filtered, or summarized (e.g., by a transformation component 208). For example, the industrial data can be appended with contextual metadata that can include, but is not limited to, a time/date stamp, a location associated with the data (e.g., a geographical location, a production area, etc.), machine statuses at the time the data was generated, personnel on duty at the time the data was generated, a hierarchical identifier indicating a source of the data within a hierarchical organizational hierarchy, or other such contextual information. Moreover, subsets of the industrial data having a similar context (e.g., a same location, production area, work shift, etc.) can be aggregated together for subsequent delivery to a cloud platform. In another example, it may be determined that a particular cloud-based application only requires data relating to a particular workcell. Accordingly, portions of the industrial data whose contextual metadata indicates that the data originates from other workcells can be filtered or discarded. Summaries can also be generated using the collected industrial data based on the contextual metadata (e.g., aggregate data from a selected plant facility and summarize the production statistics for the respective work areas in that facility).

At 1406, the industrial data is optionally encrypted (e.g., by an encryption component 210) using a predefined encryption technique. At 1408, the industrial data is sent to a cloud-based application executing on a cloud platform (e.g., by a cloud interface component 204). The cloud-based application can be, for example, a cloud-side service made available to an owner of the industrial devices as a subscription service. Exemplary cloud-based applications can include, but are not limited to, data storage services, data analysis applications, control applications (e.g., applications that can generate and deliver control instructions to industrial devices based on analysis of near real-time system data or other factors), visualization applications, reporting applications, Enterprise Resource Planning (ERP) applications, notification services, or other such applications.

FIG. 15 illustrates an example methodology 1500 for dynamically controlling an upload frequency of a cloud gateway. Initially, at 1502, industrial data is collected from one or more automation systems using a cloud gateway device or cloud gateway service (e.g., by a device interface component 206). At 1504, the industrial data is sent to a cloud-based application executing on a cloud platform at a first upload frequency (e.g., by a cloud interface component 204). For example, the cloud gateway may be operating in a fast poll mode whereby the industrial data is uploaded to the cloud platform every minute. At 1506, an instruction is received from the cloud-based application to change the upload frequency of the cloud gateway. For example, the cloud-based application may determine that a maximum total bandwidth or a maximum cloud storage utilization is at risk of being exceeded, and in response, send an instruction to the cloud gateway to alter one or more communication parameters. This can include, for example, reducing the gateway's upload frequency in order to slow the consumption of cloud resources, adjusting a data collection interval, changing the number of messages sent per data packet, changing the defined maximum number of allowed uploads per minute, or other communication parameter changes. At 1508, the cloud gateway changes communication parameters in accordance with the instruction. For example, the cloud gateway may change its upload frequency from the first upload frequency (e.g., fast poll mode) to a second upload frequency. The second upload frequency can be, for example, a slow poll mode that uploads the industrial data every 15 minutes.

FIG. 16 illustrates an example methodology 1600 for implementing store-and-forward functionality in a cloud gateway. Initially at 1602, industrial data is received (e.g., by a device interface component 1310) from one or more automation systems at a cloud gateway. At 1604, the industrial data is sent (e.g., by a cloud interface component 1306) to a cloud-based application executing on a cloud platform. At 1606, a determination is made (e.g., by a communication diagnostic component 1304) regarding whether communication to the cloud platform has been lost. If it is determined that communication has not been lost, the methodology returns to step 1602. Alternatively, if it is determined that communication has been lost, the methodology moves to step 1608, where incoming industrial data is stored (e.g., by a storage control component 1308) in local storage associated with the cloud gateway. At 1610, a determination is made (e.g., by communication diagnostic component 1304) regarding whether communication to the cloud platform has been restored. If it is determined that communication has not been restored, the methodology returns to step 1608, and the incoming industrial data continues to be stored in the local storage. Alternatively, if it is determined that communication has been restored, the methodology moves to step 1612, where the industrial data stored in the local storage at step 1608 is sent to the cloud-based application. Configuration parameters set for the cloud gateway can control how forwarding of previously stored data is handled (e.g., FIFO, FILO, etc.). Additionally, forwarding of newly received values per normal operation may occur in parallel with the forwarding activity of previously stored data to ensure that the most recent data is always available at the cloud platform. The methodology then returns to step 1602, and the methodology repeats.

Embodiments, systems, and components described herein, as well as industrial control systems and industrial automation environments in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 17:
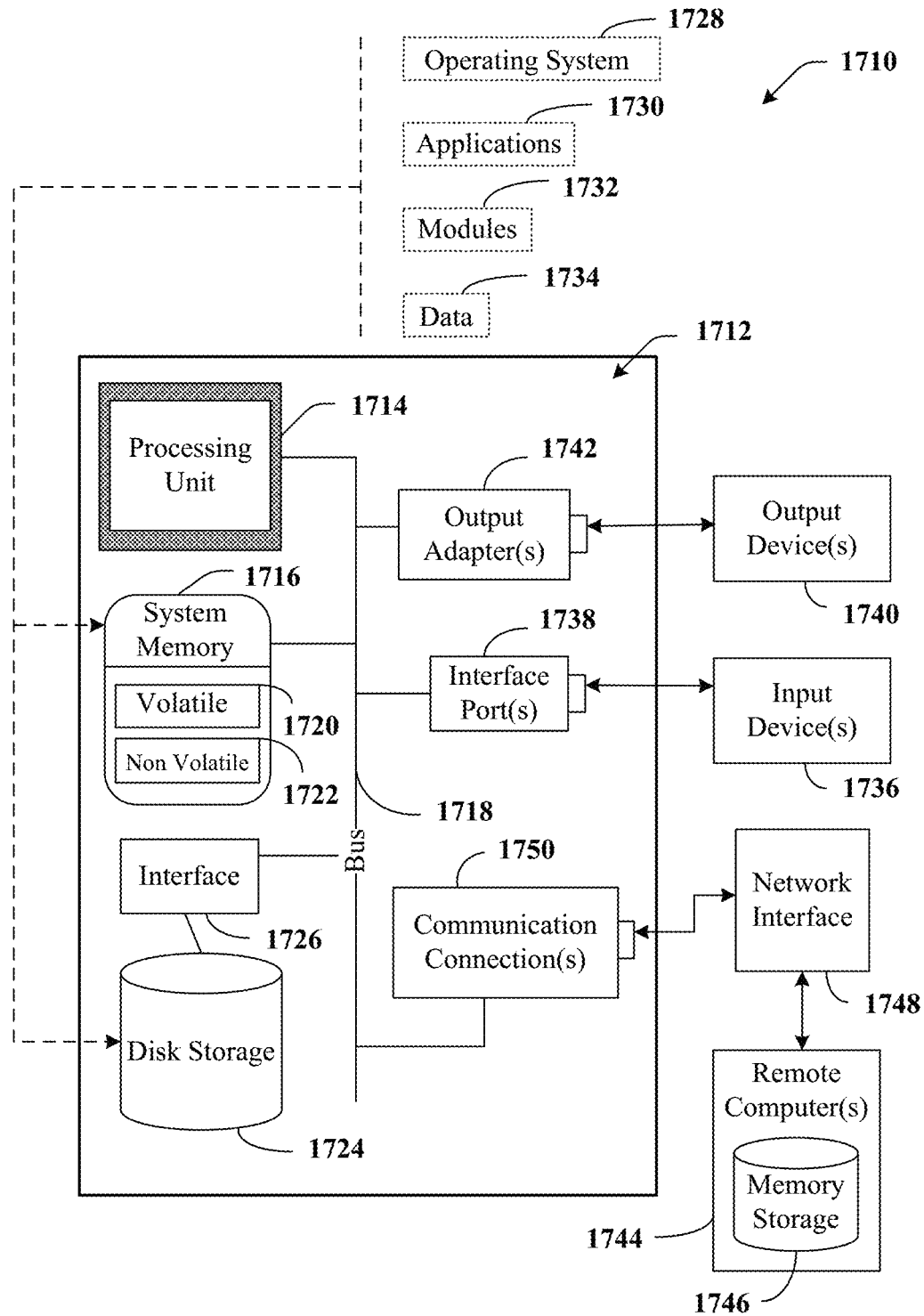
FIG. 17 is an example computing environment.
Figure 18:
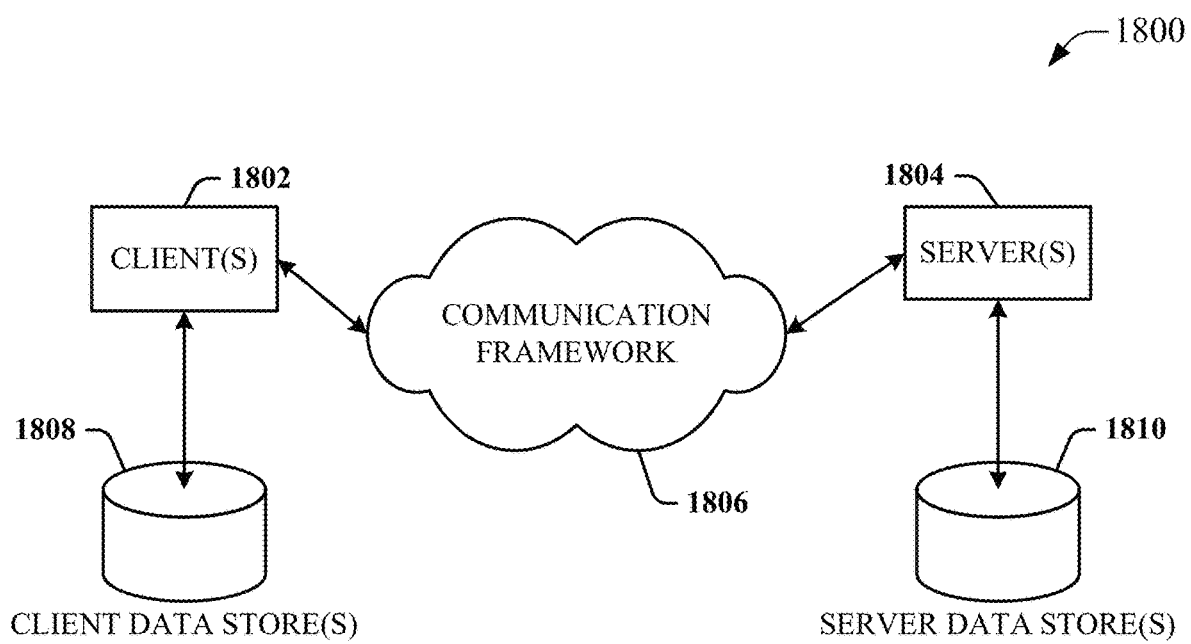
FIG. 18 is an example networking environment.

In order to provide a context for the various aspects of the disclosed subject matter, FIGS. 17 and 18 as well as the following discussion are intended to provide a brief, general description of a suitable environment in which the various aspects of the disclosed subject matter may be implemented.

With reference to FIG. 17, an example environment 1710 for implementing various aspects of the aforementioned subject matter includes a computer 1712. The computer 1712 includes a processing unit 1714, a system memory 1716, and a system bus 1718. The system bus 1718 couples system components including, but not limited to, the system memory 1716 to the processing unit 1714. The processing unit 1714 can be any of various available processors. Multi-core microprocessors and other multiprocessor architectures also can be employed as the processing unit 1714.

The system bus 1718 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1716 includes volatile memory 1720 and nonvolatile memory 1722. The basic input/output system (BIOS), containing the basic routines to transfer information between elements within the computer 1712, such as during start-up, is stored in nonvolatile memory 1722. By way of illustration, and not limitation, nonvolatile memory 1722 can include read only memory (ROM), programmable ROM (PROM), electrically programmable ROM (EPROM), electrically erasable PROM (EEPROM), or flash memory. Volatile memory 1720 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1712 also includes removable/non-removable, volatile/non-volatile computer storage media. FIG. 17 illustrates, for example a disk storage 1724. Disk storage 1724 includes, but is not limited to, devices like a magnetic disk drive, floppy disk drive, tape drive, Jaz drive, Zip drive, LS-100 drive, flash memory card, or memory stick. In addition, disk storage 1724 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1724 to the system bus 1718, a removable or non-removable interface is typically used such as interface 1726.

It is to be appreciated that FIG. 17 describes software that acts as an intermediary between users and the basic computer resources described in suitable operating environment 1710. Such software includes an operating system 1728. Operating system 1728, which can be stored on disk storage 1724, acts to control and allocate resources of the computer system 1712. System applications 1730 take advantage of the management of resources by operating system 1728 through program modules 1732 and program data 1734 stored either in system memory 1716 or on disk storage 1724. It is to be appreciated that one or more embodiments of the subject disclosure can be implemented with various operating systems or combinations of operating systems.

A user enters commands or information into the computer 1712 through input device(s) 1736. Input devices 1736 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1714 through the system bus 1718 via interface port(s) 1738. Interface port(s) 1738 include, for example, a serial port, a parallel port, a game port, and a universal serial bus (USB). Output device(s) 1740 use some of the same type of ports as input device(s) 1736. Thus, for example, a USB port may be used to provide input to computer 1712, and to output information from computer 1712 to an output device 1740. Output adapter 1742 is provided to illustrate that there are some output devices 1740 like monitors, speakers, and printers, among other output devices 1740, which require special adapters. The output adapters 1742 include, by way of illustration and not limitation, video and sound cards that provide a means of connection between the output device 1740 and the system bus 1718. It should be noted that other devices and/or systems of devices provide both input and output capabilities such as remote computer(s) 1744.

Computer 1712 can operate in a networked environment using logical connections to one or more remote computers, such as remote computer(s) 1744. The remote computer(s) 1744 can be a personal computer, a server, a router, a network PC, a workstation, a microprocessor based appliance, a peer device or other common network node and the like, and typically includes many or all of the elements described relative to computer 1712. For purposes of brevity, only a memory storage device 1746 is illustrated with remote computer(s) 1744. Remote computer(s) 1744 is logically connected to computer 1712 through a network interface 1748 and then physically connected via communication connection 1750. Network interface 1748 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1750 refers to the hardware/software employed to connect the network interface 1748 to the bus 1718. While communication connection 1750 is shown for illustrative clarity inside computer 1712, it can also be external to computer 1712. The hardware/software necessary for connection to the network interface 1748 includes, for exemplary purposes only, internal and external technologies such as, modems including regular telephone grade modems, cable modems and DSL modems, ISDN adapters, and Ethernet cards.

FIG. 18 is a schematic block diagram of a sample-computing environment 1800 with which the disclosed subject matter can interact. The system 1800 includes one or more client(s) 1810. The client(s) 1810 can be hardware and/or software (e.g., threads, processes, computing devices). The system 1800 also includes one or more server(s) 1830. The server(s) 1830 can also be hardware and/or software (e.g., threads, processes, computing devices). The servers 1830 can house threads to perform transformations by employing one or more embodiments as described herein, for example. One possible communication between a client 1810 and a server 1830 can be in the form of a data packet adapted to be transmitted between two or more computer processes. The system 1800 includes a communication framework 1850 that can be employed to facilitate communications between the client(s) 1810 and the server(s) 1830. The client(s) 1810 are operably connected to one or more client data store(s) 1860 that can be employed to store information local to the client(s) 1810. Similarly, the server(s) 1830 are operably connected to one or more server data store(s) 1840 that can be employed to store information local to the servers 1830.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A cloud gateway device, comprising:
a memory that stores executable components; and
a processor, operatively coupled to the memory, that executes the executable components, the executable components comprising:
a network infrastructure component configured to control routing of data packets between different networks;
a device interface component configured to retrieve data from one or more data tags of an industrial device associated with an industrial automation system, wherein the one or more data tags are defined in a configuration file associated with the cloud gateway device;
a transformation component configured to add contextual metadata to the data and to at least one of compress, aggregate, filter, or re-format the data to yield transformed data, wherein the contextual metadata comprises at least an identifier of a production area at which the industrial device is located; and
a cloud interface component configured to couple the cloud gateway device to a cloud platform identified by the configuration file and to send the transformed data to at least one of a cloud-based service or a cloud-based application that executes on the cloud platform,
wherein the cloud gateway device is at least one of a firewall device, a network router, a network hub, or a network switch.

2. The cloud gateway device of claim 1, wherein the contextual metadata comprises at least one of a date stamp, a time stamp, work shift information, an identity of a product being produced at the production area, machine state information identifying a state of a machine at the time that the data was generated, an employee identifier, a lot number, an identity of an active alarm, or a hierarchical organizational tag.

3. The cloud gateway device of claim 1, wherein the configuration file identifies a uniform resource locator corresponding to at least one of the cloud platform or an application that executes on the cloud platform.

4. The cloud gateway device of claim 1, wherein the configuration file further identifies one or more communication parameters for the cloud gateway device.

5. The cloud gateway device of claim 1, wherein the executable components further comprise an encryption component configured to encrypt the data prior to sending the transformed data to the cloud platform.

6. The cloud gateway device of claim 1, wherein the cloud interface component is configured to send the transformed data to the cloud platform via a wireless radio.

7. The cloud gateway device of claim 1, wherein the executable components further comprise:
a communication diagnostic component configured to determine a status of a communication link between the cloud interface component and the cloud platform; and
a storage control component configured to store the data in a local storage of the cloud gateway device in response to a determination by the communication diagnostic component that the communication link is not operational.

8. The cloud gateway device of claim 1, wherein the industrial device comprises at least one of an industrial controller, an I/O device, a telemetry devices, a motion control device, a motor drive, a human-machine interface device, an industrial robot, a barcode marker, a barcode reader, or a vision system device.

9. The cloud gateway device of claim 1, wherein the cloud interface component is configured to send the transformed data to the cloud platform at an upload frequency controlled by a cloud-based application from the cloud platform.

10. The cloud gateway device of claim 1, wherein the cloud interface component is further configured to receive, from at least one of the cloud-based service or the cloud-based application, an instruction to modify a setpoint on the industrial device, and to modify the setpoint on the industrial device via one of the networks in accordance with the instruction.

11. The cloud gateway device of claim 1, wherein the at least one of the cloud-based service or the cloud-based application is a cloud-based enterprise resource planning system or a cloud-based human-machine interface.

12. A method for sending industrial data to a cloud platform, comprising:
routing, by a network infrastructure device comprising a processor, data packets between two or more networks, wherein the network infrastructure device is at least one of a firewall device, a network router, a network hub, or a network switch;
reading, by the network infrastructure device, data from one or more data tags of an industrial device associated with an industrial automation system, wherein the one or more data tags are identified in a configuration file associated with the device;
appending, by the network infrastructure device, contextual metadata to the data to yield contextualized data, the contextual metadata comprising at least an identifier of a production area at which the industrial device is located;
transforming, by the network infrastructure device, the contextualized data to yield transformed data, wherein the transforming comprises at least one of compressing, aggregating, filtering, or re-formatting the contextualized data; and
sending, by the network infrastructure device, the transformed data to at least one of a cloud-based service or a cloud-based application residing on a cloud platform, wherein the at least one of the cloud-based service or the cloud-based application is identified in the configuration file.

13. The method of claim 12, wherein the appending contextual metadata comprises appending, in addition to the identifier of the production area, at least one of date information, time information, shift information, an identity of a product, machine state information, an employee identifier, a lot number, an identity of an active alarm, or a hierarchical organizational tag.

14. The method of claim 12, wherein the transforming further comprises encrypting the data prior to the sending.

15. The method of claim 12, further comprising:
determining, by the network infrastructure device, a status of a communication link between the network infrastructure device and the cloud platform; and
in response to determining that the communication link is not operational, storing, by the network infrastructure device, the data in a local storage of the device.

16. The method of claim 12, wherein the reading comprises reading the data from at least one of industrial controller, an I/O device, a telemetry devices, a motion control device, a motor drive, a human-machine interface device, an industrial robot, a barcode marker, a barcode reader, or a vision system device.

17. The method of claim 12, wherein the sending comprises sending the transformed data via a wireless radio.

18. A non-transitory computer-readable medium having stored thereon executable instructions that, in response to execution, cause a network infrastructure device to perform operations, the operations comprising:
routing data packets between multiple networks;
collecting data from one or more data tags of an industrial device of an industrial automation system, wherein the one or more data tags are specified in a configuration file associated with the gateway device;
adding contextual metadata to the data to yield contextualized data, wherein the adding the contextual metadata comprises adding at least an identifier of a production area in which the industrial device is installed;
at least one of compressing, aggregating, filtering, or re-formatting the contextualized data to yield transformed data; and
sending the transformed data to at least one of a cloud-based service or a cloud-based application residing on a cloud platform, wherein
the at least one of the cloud-based service or the cloud-based application is specified in the configuration file, and
the network infrastructure device is at least one of a firewall device, a network router, a network hub, or a network switch.

19. The non-transitory computer-readable medium of claim 18, wherein the adding the contextual metadata further comprises adding at least one of date information, time information, shift information, an identity of a product, machine state information, an employee identifier, a lot number, an identity of an active alarm, or a hierarchical organizational tag.

20. The non-transitory computer-readable medium of claim 18, wherein the collecting comprises retrieving the data from at least one of industrial controller, an I/O device, a telemetry devices, a motion control device, a motor drive, a human-machine interface device, an industrial robot, a barcode marker, a barcode reader, or a vision system device.

* * * * *